United States Patent Office 3,478,032
Patented Nov. 11, 1969

3,478,032
N-SUBSTITUTED-N'-ARYL
DIAZACYCLOALKANES
Vishwa Prakash Arya, Bombay, India, assignor to Ciba Limited, Basel, Switzerland, a company of Switzerland
No Drawing. Continuation-in-part of application Ser. No. 452,877, May 3, 1965. This application Jan. 3, 1968, Ser. No. 695,344
Claims priority, application Switzerland, May 4, 1964, 5,798/64; Mar. 2, 1965, 2,873/65
Int. Cl. C07d 51/72, 49/18; A61k 27/00
U.S. Cl. 260—268
15 Claims

ABSTRACT OF THE DISCLOSURE

Compounds of the formula $$N-[(1-A-3-R-5-R_1-4-pyr)-\overset{X}{\underset{\|}{C}}-alk-CH_2]-N'-Z-\text{diazacycloalkane}$$

in which diazacycloalkane has 6 to 8 ring members, 4-pyr is a 4-pyrazolyl residue, A is hydrogen, optionally substituted alkyl or optionally substituted phenyl, phenyl-lower alkyl or pyridyl, R is hydrogen or lower alkyl, $R_1$ is lower alkyl, X represents oxo or hydrogen together with hydroxy, lower alkoxy or lower alkanoyloxy, alk is lower alkylidene and Z is optionally substituted phenyl or pyridyl, or salts thereof have antihypertensive and psychotropic, e.g. tranquilizing and sedative properties.

CROSS-REFERENCES TO RELATED APPLICATIONS

This is a continuation-in-part of application Ser. No. 452,877, filed May 3, 1965 (now abandoned).

SUMMARY OF THE INVENTION

The present invention relates to the manufacture of $$N-[pyr-(4)-\overset{X}{\underset{\|}{C}}-alk-CH_2[-N'-Z-\text{diazacycloalkanes}$$

in which the nitrogen atoms of the diazacycloalkane are separated one from the other by at least 2 carbon atoms, and in which pyr-(4) represents a pyrazolyl-(4) radical, X represents oxygen or a hydrogen atom together with a free or substituted hydroxyl group, Z is an aromatic radical and alk represents a lower alkylidene-(1:1) radical, or salts of such compounds, as well as compositions, particularly pharmaceutical compositions containing them and process for their manufacture. The compounds and compositions containing them are useful as antihypertensive and psychoactive agents.

DESCRIPTION OF THE PREFERRED EMBODIMENTS

The pyrazolyl-(4) radical is primarily one which is substituted in 1-position by a hydrocarbon radical that may be substituted or a monocyclic heterocyclic radical of aromatic character. As hydrocarbon radicals there may be mentioned low aliphatic hydrocarbon radicals, for example, low alkyl radicals, by which is meant, for example, methyl and ethyl radicals and straight chain and branched propyl, butyl and pentyl radicals bound in any position, and also aliphatic hydrocarbon radicals, for example, cyclopentyl or cyclohexyl radicals, aromatic hydrocarbon radicals, such as phenyl radicals, and araliphatic hydrocarbon radicals. Substituents of the aliphatic hydrocarbon radicals in 1-position of the pyrazolyl-(4) radical are primarily hydroxyl groups or halogen atoms, for example, chlorine or bromine, or free or substituted amino groups, especially mono- or di-low alkylamino groups, alkylene- or oxa- or aza-alkyleneamino groups, for example, mono- or di-methyl- or ethyl-amino, pyrrolidino, piperidino, morpholino, piperazine, N-low alkyl-piperazino, N-β-hydroxy-low alkyl-piperazino groups, and in which a substituent of the amino group may also be bound to the aliphatic radical, as in N-low alkyl-piperidyl-(4) radicals or in N-low alkyl-pyrrolidyl-(3)-low alkyl radicals. Substituents of the alicyclic radicals are mainly low alkyl radicals, whereas the aromatic radicals may carry, for example, low alkyl or alkoxy groups, halogen atoms, trifluoromethyl groups or nitro or amino groups. By low alkoxy groups is meant in this case and hereinafter, for example, those having 1 to 5 carbon atoms, primarily methoxy and ethoxy groups.

Heterocyclic radicals in 1-position of the pyrazolyl-(4) radical are principally pyridyl or thienyl radicals, which for example, may be substituted like the aromatic radicals. Preference is given to the pyridyl-(2) radical.

The new compounds may also contain further substituents in the pyrazole nucleus, especially low alkyl radicals, phenyl radicals or pyridyl radicals, and the phenyl and pyridyl radicals may be substituted in the manner described above. The pyrazole nucleus advantageously contains a low alkyl radical in 5-position, for example, one of the radicals indicated above, especially a methyl radical.

The hydroxyl group in 3-position of the propyl radical is advantageously free. If it is substituted, it may be an etherified hydroxyl group, e.g. a hydroxyl group substituted with a low aliphatic hydrocarbon radical, for example, a low alkyl or alkenyl radical, for example, a methyl, ethyl, propyl, isopropyl or allyl radical. The term "substituted hydroxyl groups" may also include esterified hydroxyl groups, for example, those derived from amino-, low alkylamino-, di-low alkylamino- or low alkoxy formic acids or from low alkane carboxylic acids, for example, acetic acid or propionic acid.

The aromatic radical Z is preferably at most bicyclic and is above all a phenyl or a pyridyl radical each of which may be substituted e.g. as indicated above for the aromatic and heterocyclic radicals in 1-position of the pyrazole nucleus.

The radical alk is a low alkylidene-(1:1) radical, for example, ethylidene-(1:1) or propylidene-(1:1), but more especially methylene.

As diazacycloalkanes there may be mentioned, above all, those in which the nitrogen atoms are separated one from the other by 2 or 3 carbon atoms, especially piperazine and its C-low alkyl substitution products, for example, 2-methyl- or 2:6-dimethyl-piperazine.

The new compounds possess valuable pharmacological properties. Thus, they produce a prolonged fall of blood pressure as shown, for example, in tests with animals, such as dogs and cats, including antihypertensive effects as shown, for example, in tests renal hypertensive rats. Furthermore, compounds of this invention exhibit psychotropic, particularly sedative and tranquilizing properties as shown, for example, in experiments with animals, such as mice, rats, cats and monkeys. They are therefore useful pharmacologically, for example, as antihypertensive and psychoactive agents.

Compounds that are specially valuable as hypotensive agents are those of the formulae

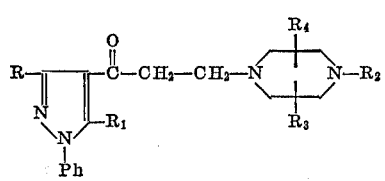

and

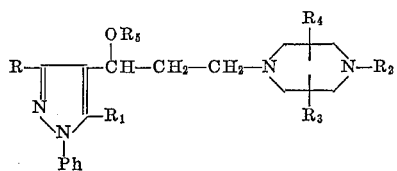

and

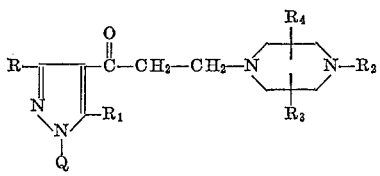

and

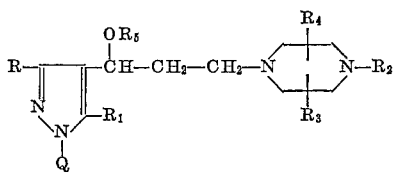

and

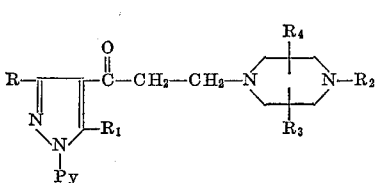

and

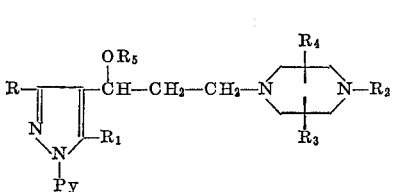

in which R stands for low alkyl or preferably for hydrogen, Ph is an unsubstituted phenyl radical or a phenyl radical substituted by one or more halogen atoms, such as chlorobromo or fluoro, trifluoromethyl groups, low alkyl groups, such as methyl, low alkoxy groups, such as methoxy, amino and/or nitro groups, Q represents a low hydroxy alkyl radical, especially β-hydroxy-ethyl, or a Ph-low alkyl radical, wherein Ph has the meanings given above, especially β-phenyl-ethyl, and Py represents a pyridyl radical optionally substituted as indicated above for Ph, $R_1$ is a low alkyl radical, especially methyl, $R_2$ is an unsubstituted phenyl radical or a phenyl radical substituted by one or more low alkyl, low alkoxy, trifluoromethyl and/or halogen groups and especially by one or more methyl, chloro, fluoro, methoxy and/or trifluoromethyl radicals, $R_3$ and $R_4$ represent especially hydrogen or a low alkyl radical, and $R_5$ represents hydrogen or a low alkyl radical especially a methyl or an ethyl radical.

Of these compounds, the compounds of the following formulae are especially valuable as hypotensive agents:

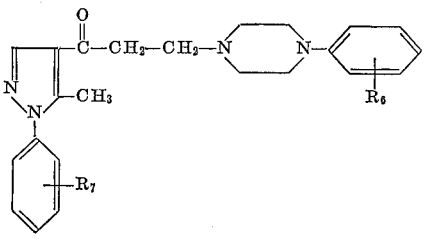

and

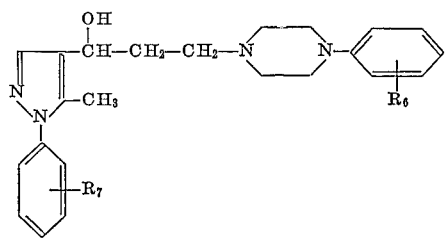

and

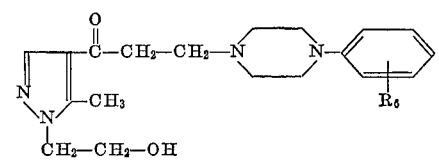

and

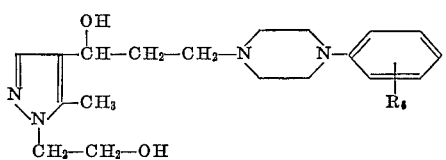

and

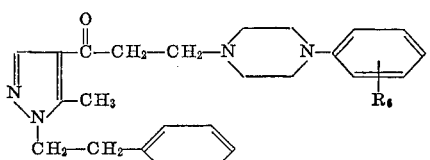

and

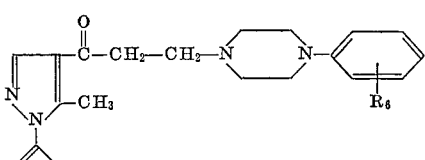

and

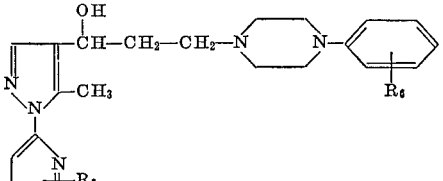

and

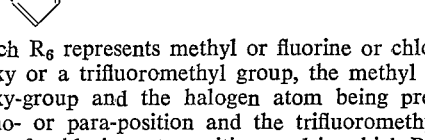

in which $R_6$ represents methyl or fluorine or chlorine or methoxy or a trifluoromethyl group, the methyl and the methoxy-group and the halogen atom being preferably in ortho- or para-position and the trifluoromethyl radical is preferably in meta-position, and in which $R_7$ represents a hydrogen atom or a fluorine atom or a nitro group, the last being advantageously in para-position, and $R_8$ represents a hydrogen or a halogen atom, especially N-[3 - (1 - phenyl - 5 - methyl - 4 - pyrazolyl) - 3 - hydroxy - 1 - propyl] - N' - (2 - methyl - phenyl) - piperazine of the formula

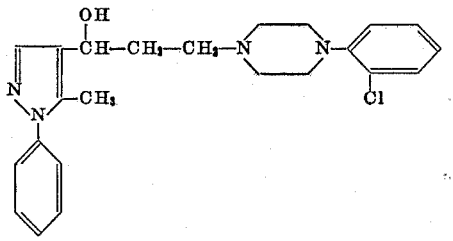

and N - [3 - (1 - phenyl - 5 - methyl - 4 - pyrazolyl) - 3 - hydroxy - 1 - propyl] - N' - (2 - chlorophenyl) - piperazine of the formula

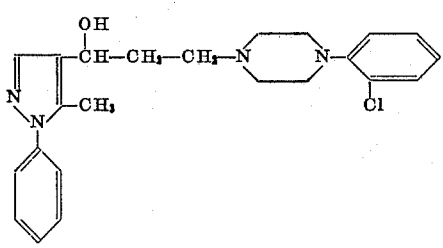

and N - [3 - (1 - phenyl - 5 - methyl - 4 - pyrazolyl) - 3 - oxo - 1 - propyl] - N' - (4 - fluorophenyl) - piperazine of the formula

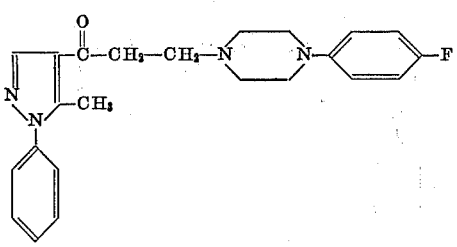

and N - [3 - (1 - phenyl - 5 - methyl - 4 - pyrazolyl) - 3 - oxo - 1 - propyl] - N' - (2 - methyl - phenyl) - piperazine of the formula

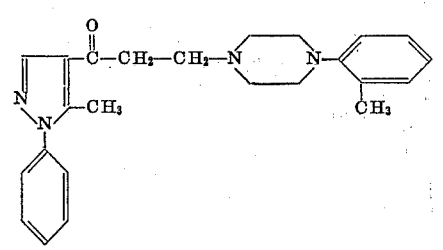

and N - [3 - (1 - phenyl - 5 - methyl - 4 - pyrazolyl) - 3 - oxo - 1 - propyl] - N' - (2 - methoxy - phenyl) - piperazine of the formula

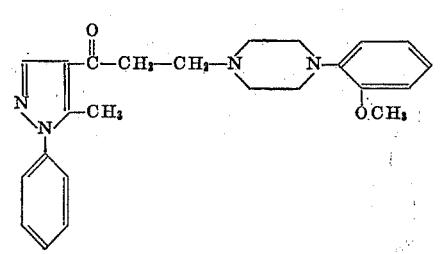

and N - [3 - (1 - phenyl - 5 - methyl - 4 - pyrazolyl) - 3 - oxo - 1 - propyl] - N' - (2 - fluoro - phenyl) - piperazine of the formula

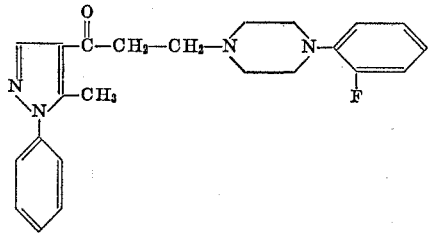

and N - [3 - (1 - (4 - nitro - phenyl) - 5 - methyl - 4 - pyrazolyl) - 3 - hydroxy - 1 - propyl] - N' - (4 - fluoro - phenyl) - piperazine of the formula

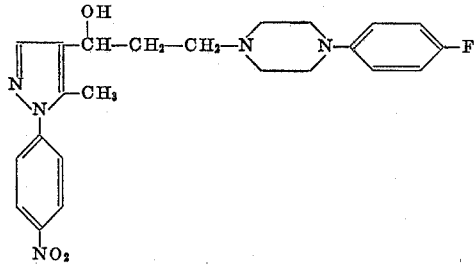

and N [3 - (1 - phenyl - 5 - methyl - 4 - pyrazolyl) - 3 - oxo - 1 - propyl] - N' - (4 - methoxy - phenyl) - piperazine of the formula

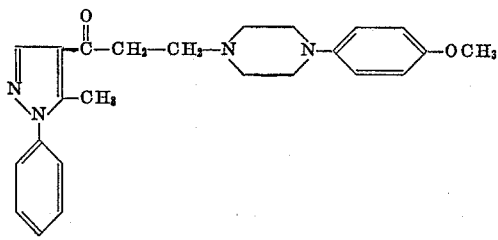

and N - [3 - (1 - (4 - nitro - phenyl) - 5 - methyl - 4 - pyrazolyl) - 3 - oxo - 1 - propyl] - N' - (4 - fluoro - phenyl) - piperazine of the formula

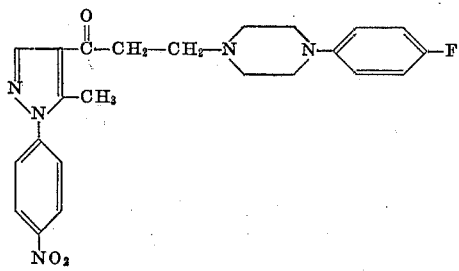

and N - [3 - (1 - (4 - fluoro - phenyl) - 5 - methyl - 4 - pyrazolyl) - 3 - oxo - 1 - propyl] - N' - (2 - methyl - phenyl) - piperazine of the formula

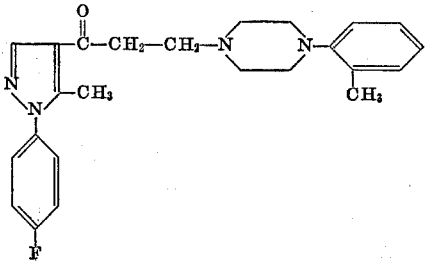

and N - [3 - (1 - (4 - fluoro - phenyl) - 5 - methyl - 4 - pyrazolyl) - 3 - oxo - 1 - propyl] - N' - (4 - fluoro - phenyl) - piperazine of the formula

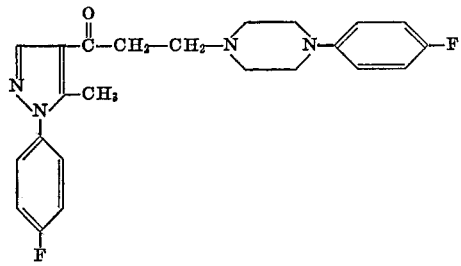

and N - [3 - (1 - (2 - fluoro - phenyl) - 5 - methyl - 4 - pyrazolyl) - 3 - oxo - 1 - propyl] - N' - (4 - fluoro - phenyl) - piperazine of the formula

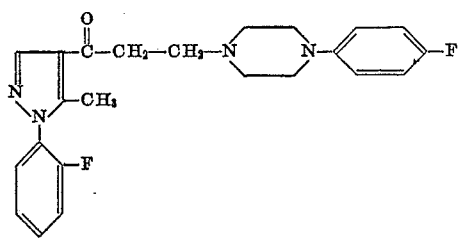

and N-[3 - (1-(2,5-dicholoro-phenyl)-5-methyl-4-pyrazolyl)-3-oxo-1-propyl] - N'-(2-methyl-phenyl)-piperazine of the formula

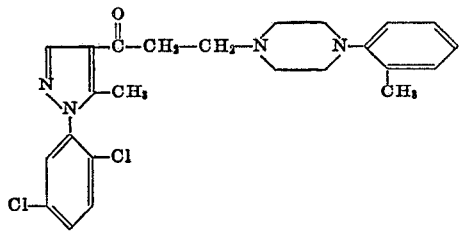

and N-[3-(1-(2,4,6-trichloro-phenyl)-5-methyl - 4-pyrazoolyl) - 3 - oxo - 1-propyl]-N'-(4-fluoro-phenyl)-piperazine of the formula

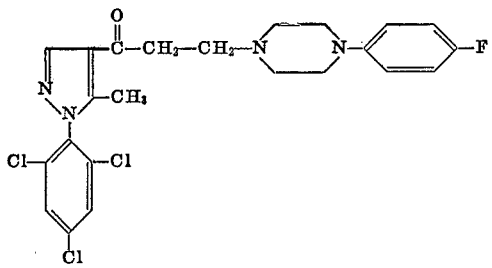

and N-[3-(1-β-hydroxyethyl - 5 - methyl - 4 - pyrazolyl)-3 - oxo-1-propyl]-N'-(2-methyl-phenyl)-piperazine of the formula

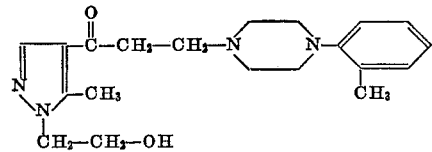

and N-[3-(1-β-hydroxyethyl - 5 - methyl - 4 - pyrazolyl)-3-oxo - 1 - propyl]-N'-(2-methoxy-phenyl)-piperazine of the formula

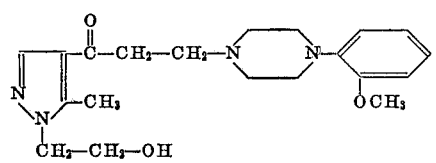

and N-[3-(1-(β-phenethyl) - 5 - methyl - 4 - pyrazolyl)-3-oxo - 1 - propyl]-N'-(4 - fluorophenyl)-piperazine of the formula

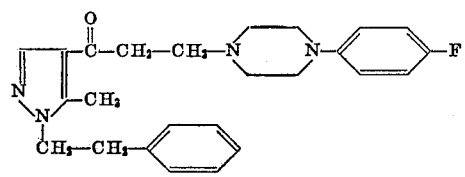

and N-[3-(1-(2-pyridyl) - 5 - methyl-4-pyrazolyl)-3-oxo-1 - propyl] - N'-(2 - methyl-phenyl)-piperazine of the formula

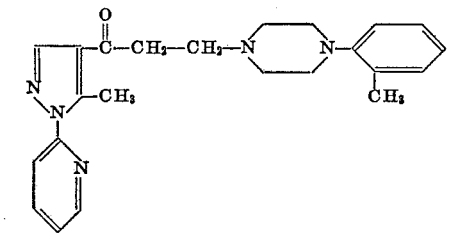

and N-[3-(1-(2-pyridyl) - 5 - methyl - 4 - pyrazolyl)-3-oxo - 1 - propyl]-N'-(2-chlorophenyl)-piperazine of the formula

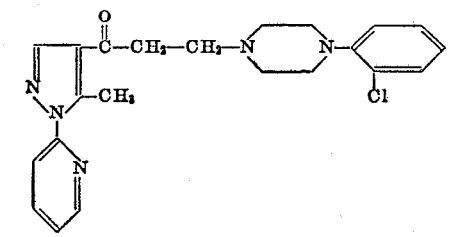

and N-[3-(1-(2-pyridyl) - 5 - methyl - 4 - pyrazolyl)-3-oxo - 1 - propyl]-N'-(4-fluorophenyl)-piperazine of the formula

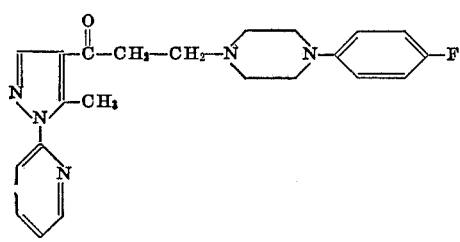

and N-[3-(1-(2-pyridyl) - 5 - methyl - 4 - pyrazolyl)-3-oxo - 1 - propyl]-N'-(2-fluoro-phenyl)-piperazine of the formula

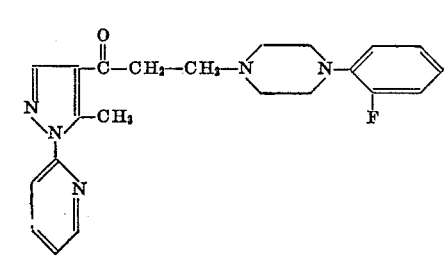

and N-[3-(1-(2-pyridyl) - 5 - methyl - 4 - pyrazolyl)-3-oxo - 1 - propyl]-N'-(3-chloro-phenyl)-piperazine of the formula

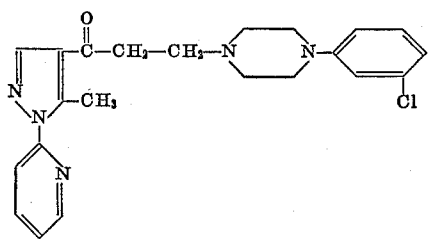

and N-[3-(1-(5-bromo - 2 - pyridyl)-5-methyl-4-pyrazolyl) - 3 - oxo - 1 - propyl]-N'-(2-methoxyphenyl)-piperazine of the formula

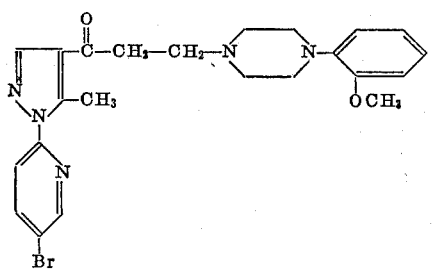

and N-[3-(1-(5-bromo - 2 - pyridyl)-5-methyl-4-pyrazoyl) - 3 - oxo - 1 - propyl]-N'-(4-fluorophenyl)-piperazine of the formula

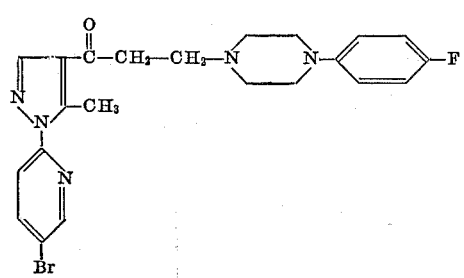

in tests with animals, such as rats, compounds of the above type, when given orally or intravenously, show hypotensive effects at doses of about 0.00025 g./kg. to about 0.01 g./kg. The last two compounds also possess valuable sedative, tranquilizing properties and are amphetamine antagonists.

Compounds that are specially valuable as sedative, tranquilizing agents and which antagonize morphine, serotonine and amphetamine and which potentiate the action of barbiturates, are those of the formulae

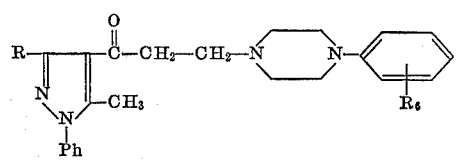

and

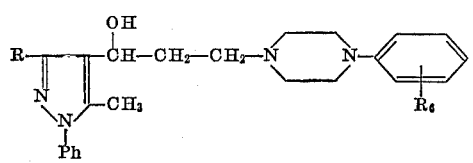

wherein R is a lower alkyl or preferably hydrogen, Ph is a halogen-phenyl radical, especially a p-bromophenyl radical or a fluoro-phenyl radical and $R_6$ represents fluorine or methoxy or methyl or chlorine or trifluoromethyl group, the halogen-atom and methoxy group being advantageously in ortho or para position, especially N-[3-(1-(4-bromophenyl) - 5 - methyl-4-pyrazolyl)-3-oxo-1-propyl]-N'-(2-methoxy-phenyl)-piperazine of the formula

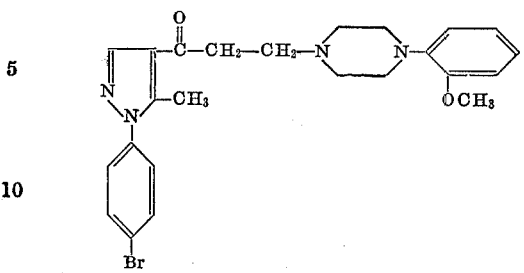

and N-[3-(1-(4-bromophenyl)-5-methyl - 4 - pyrazolyl)-3-oxo - 1 - propyl]-N'-(2-methyl-phenyl-piperazine of the formula

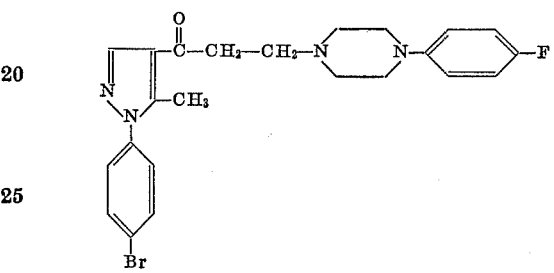

and N-[3-(1-(2-fluorophenyl) - 5 - methyl-4-pyrazolyl)-3-oxo- 1 - propyl]-N'-(2-methyl-phenyl)-piperazine of the formula

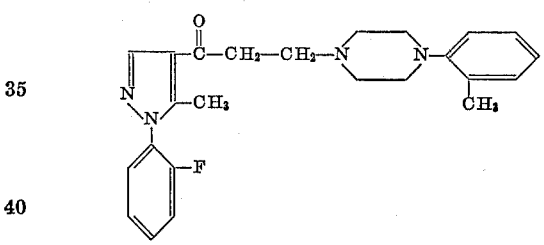

and N-[3-(1-(4-fluorophenyl) - 5 - methyl-4-pyrazolyl)-3-oxo-1-propyl]-N'-(2-fluoro-phenyl) - piperazine of the formula

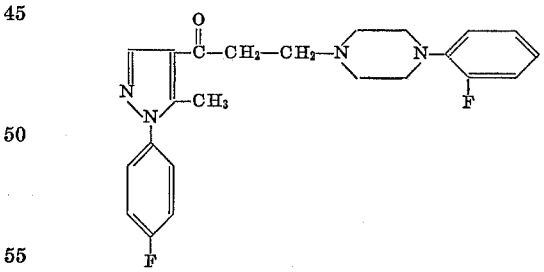

and N-[3-(1-(4-bromophenyl) - 5 - methyl-4-pyrazolyl)-3-hydroxy - 1 - propyl]-N'-(4-fluoro-phenyl)-piperazine of the formula

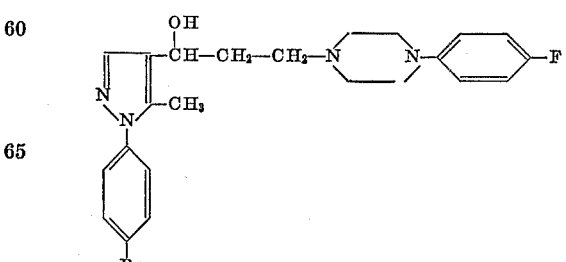

in tests with animals, compounds of the above type, when given in doses of about 0.0025 g./kg. to about 0.02 g./kg. produce significant sedative tranquilizing effects.

The new compounds are obtained by methods in themselves known.

Advantageously the procedure is to react a 4-low alkanoyl pyrazole with formaldehyde and an N-unsubstituted N'-Z-diazacyclo alkane whose nitrogen atoms are separated one from the other by at least 2 carbon atoms and wherein Z has the meanings given above or an amino compound having at least one hydrogen atom attached to the nitrogen atom and that permits the formation of an N'-Z-diazacyclo alkane ring or to react a

wherein X and alk have the meanings given above and Y is a reactive esterified hydroxyl group, with the said N'-2-diazacyclo alkane or amino compound and, in the compounds thus obtained, to form N'-Z-diazacycloalkane ring with the aforementioned group that permits the formation of an N'-Z-diazacycloalkane ring and, at any stage of the process if desired or required, to reduce the oxo group to a hydroxyl group and, if desired or required to substitute the said hydroxyl group and/or in the compounds thus obtained to reduce nitro groups that are present to form amino groups and/or to convert free bases that are obtained into salts or to convert salts that are obtained into free bases and/or, if desired or required, to resolve racemic compounds that are obtained into their optical antipodes.

The reaction with formaldehyde and the N'-Z-diazacycloalkane or the amino compound is carried out in accordance with the Mannich reaction. For example, instead of formaldehyde, an agent that yields formaldehyde may be used, for example, trihydroxymethylene or paraformaldehyde, if desired or required, in the presence of an acid. The amino compound is advantageously used in the form of a salt. Preferably, the reaction is performed in a diluent, for example, in an alcohol or dioxan. When using polymerization products of formaldehyde the reaction is advantageously carried out in an organic diluent, as indictaed above, or in benzene, toluene, nitrobenzene or nitromethane. The reaction is advantageously carried out at an elevated temperature and/or in a closed vessel. The reaction of the

wherein Y is preferably a halogen atom or a sulphonyloxy, such as a benzene sulphonyloxy group, e.g. the p-toluene sulphonyloxy group, and X is advantageously an oxo group, with the N'-Z-diazacycloalkane or the amino compound is carried out in the usual manner, advantageously in the presence of an acid binding material, such as a basic condensing agent.

As amino compound that permits the formtaion of an N'-Z-diazacycloalkane ring there may be used ammonia or more especially a primary or secondary amine whose substituents permit ring closure to form an N'-Z-diazacycloalkane. Such radicals are, for example, alkyl radicals that contain in β-position or in a higher position an N-Z-amino group having at least 1 hydrogen atom or a free hydroxyl group or a hydroxyl group made reactive by esterification.

Building up of the N'-Z-diazacycloalkane ring is effected in the customary manner. For example, the free amino group may be reacted with a reactive diester of an appropriate N'-Z-dihydroxyalkyl amine to form the N'-Z-diazacycloalkane ring. The above-mentioned amines that have substituents that permit the formation of the N'-Z-diazacycloalkane ring attached to the amino group may also be formed from the free amino group by simultaneous or stepwise mono- or di-substitution with reactive derivatives of alcohols that contain in β-position or in a higher position, an N-Z-amino group having at least 1 hydrogen atom or a free hydroxyl group or a hydroxyl group made reactive by esterification such as with their reactive esters or corresponding epoxides.

In the secondary pyrazolyl-(4)-3-X-propyl-(1)-amines having a free hydroxy-alkyl radical or a hydroxyalkyl radical made reactive by esterification that are obtained, the said hydroxyalkyl radical is, if necessary, first made reactive by esterification and then reacted with a primary or secondary N-Z-amine and then with the reactive diester of an appropriate alkane-diol.

In the compounds obtained having an amino group substituted by a secondary N-Z-aminoalkyl radical and a hydroxyalkyl radical the hydroxyl group is made reactive by esterification and ring closure is effected.

In the compounds obtained having an amino group substituted by 2 hydroxyalkyl group that may have been made reactive by esterification, the ring is closed by reaction with the N-Z-amine, if necessary, after the hydroxyl groups have been made reactive by esterification. Di-(secondary aminoalkyl)-amino compounds that are obtained may be cyclicized directly.

The reduction of the oxo group is carried out in the customary manner. Metallic reduction is advantageous for example, by a treatment with sodium in alcohol, or with complex metal hydrides, for example, sodium-boron hydride, or by catalytically activated hydrogen in the presence of a hydrogenation catalyst, for example, a platinum, palladium, nickel, copper or rhodium catalyst, for example, platinum oxide, palladium charcoal, Raney nickel, copper chromite or rhodium on a carrier such as alumina or charcoal. The reaction is advantageously carried out in the presence of a diluent and/or solvent at a low temperature, room temperature or an elevated temperature in an open vessel or in a closed vessel under pressure.

The reduction of the oxo group can be effected by the Meerwein-Ponndorf-Verley method. For example, the oxo compound may be treated in the customary manner with a low alkanol, for example, isopropanol, in the presence of an appropriate alcoholate, for example, aluminium isopropylate.

The etherification or esterification of a free hydroxyl group in 3-position of the propyl radical is carried out in the usual manner. For example, diazo compounds, for instance, diazoalkanes, are allowed to act on the hydroxyl group, advantageously in the presence of a suitable Lewis acid, for example, fluoboric acid, aluminium chloride, boron trifluoride etherate or aluminum low alkanolate, or a metal salt is formed and reacted with a reactive ester of an alcohol, or the hydroxyl group is made reactive by esterification in that it is exchanged for a halogen atom or is converted into a sulphonyloxy group, and is then reacted with an alcohol, advantageously in the form of a metal salt. The esterification is advantageously effected by reaction with acid halides, acid anhydrides, ketenes, isocyanates or isothiocyanates, if desired or required, in the presence of condensing agents such as bases in order to bind any acid that might form.

The subsequent reduction of nitro groups is likewise carried out in the customary manner, for example, with catalytically activated hydrogen, nascent hydrogen or by means of metal hydrides, for example, lithium-aluminium hydride or sodium-boron hydride. This reduction may be carried out simultaneously with the reduction of the oxo group, whereby N-benzyl groups may also be hydrogenolysed.

Hydroxyl groups made reactive by esterification as indicated in the above-mentioned reactions are, above all, those that are derived from strong inorganic acids, for example, a hydrohalic acid or sulphuric acid, or from strong organic sulphonic acids, e.g. benzene sulphonic acids, such as toluene sulphonic acids.

The esterification of hydroxyl groups to make them reactive is carried out by methods in themselves known, for example, by means of halides of sulphur or phosphorus, especially thionyl chloride, or by means of sulphonyl halides.

In the process of the invention the reactions are carried out in the usual manner at room temperature, at a reduced temperature or at an elevated temperature, in an open or closed vessel, if desired or required, under superatmospheric pressure, in the presence or absence of diluents and/or catalysts, and/or condensing agents.

Depending on the reaction conditions, the new compounds are obtained either in the free form or in the form of their salts.

The salts of the compounds of the present invention are acid addition salts, for example, pharmaceutically useful acid addition salts, primarly those of inorganic acids, for example, hydrochloric acid, hydrobromic acid, nitric acid, sulphuric acid or phosphoric acid, but also of organic acids, for example, organic carboxylic acids, for instance, acetic acid, propionic acid, glycolic acid, malonic acid, succinic acid, maleic acid, hydroxymaleic acid, dihydroxymaleic acid, fumaric acid, malic acid, tartaric acid, citric acid, benzoic acid, cinnamic acid, mandelic acid, salicylic acid, 4-amino-salicylic acid, 2-phenoxy-benzoic acid, 2-acetoxy-benzoic acid, pamoic acid, glucuronic acid, nicotinic acid or isonicotinic acid, or of organic sulphonic acids, for example, methane sulphonic acid, ethane sulphonic acid, 2-hydroxyethane sulphonic acid, ethane-1,2-disulphonic acid, benzene sulphonic acid, para-toluene sulphonic acid or naphthalene-2-sulphonic acid. Other acid addition salts may be used as intermediate products, for example, in the purification of the free compounds or in the preparation of other salts, and also for identification. Salts that are specially prepared for identification are, for example, those of acidic organic nitro compounds, for example, picric acid, picrolonic acid or flavianic acid, or of metal-complex acids, for example, phosphotungstic acid, phosphomolybdic acid, chloroplatinic acid or Reinecke acid. The mono- or poly-salts may be prepared therefrom.

The salts obtained may be converted into the free bases, for example, by a treatment with a base, for example, with a metal hydroxide, for instance, lithium hydroxide, sodium hydroxide, potassium hydroxide or calcium hydroxide, a metal carbonate, for example, sodium, potassium or calcium carbonate or hydrogen carbonate, ammonia or with a suitable hydroxyl ion exchanger.

The salts obtained may be converted into other salts, for example, by treating a salt of an inorganic acid with a suitable metal salt, for example, the sodium, barium or silver salt of an acid in a suitable solvent in which the new salt that is formed is insoluble and thus precipitates out of the reaction mixture, or by treatment with an ion exchanger.

The free bases obtained may be converted into their acid addition salts by reaction with acids, for example, with the above-mentioned acids, for example, by treating the solution of a base in a suitable inert solvent or mixture of solvents with an acid or with a solution thereof, or with a suitable anion exchanger, and isolating the desired salt. The mono- or poly-salts may also be obtained in the form of their hydrates or contain the solvent used for crystallization. Owing to the close relationship between the new compounds in the free form and in the form of a salt thereof, whenever a free compound is referred to in this context, a corresponding salt is also intended, provided such is possible or appropriate under the circumstances.

The racemates obtained may be resolved into the optically active d and l forms by known methods, for example, by crystallization from optically active solvents or by treatment of the racemic compound with one of the optically active forms of an acid with an asymmetrical carbon atom, advantageously in the presence of a suitable solvent. Specially suitable for this purpose are d-tartaric-(l-tartaric) acid and l-tartaric-(d-tartaric) acid, and also the optically active forms of malic acid, mandelic acid, camphor-10-sulphonic acid or quininic acid. The salts obtained may be converted into other salts or into the free and optically active bases, and an optically active base may be converted into an acid addition salt by the methods described above.

The invention further includes any variant of the present process in which an intermediate product obtainable at any stage of the process is used as starting material and any remaining steps are carried out, or the process is discontinued at any stage thereof, or in which a starting material is formed under reaction conditions. The invention also includes any new intermediate products that are formed.

In the process of the present invention there are advantageously used those starting materials that yield the compounds described in the foregoing as being specially valuable. The starting materials are known or may be obtained by known methods. If necessary, they may also be used in the form of their salts.

The compounds of the present invention are intended for use as medicaments, for example, in the form of pharmaceutical preparations that contain these compounds in admixture or conjunction with an organic or inorganic, solid or liquid pharmaceutical excipient suitable for enteral, for example, oral, or parenteral administration. The pharmaceutical preparations may be, for example, tablets, dragees or capsules, or in liquid form as solutions, suspensions or emulsions. They may contain assistants such as preserving, stabilizing, wetting or emulsifying agents, salts for regulating the osmotic pressure, buffers, dyestuffs or flavouring. They may further contain other therapeutically valuable substances.

The following examples illustrate the invention.

EXAMPLE 1

4 g. of 1-phenyl-4-acetyl--methyl-pyrazole and 2.7 g. of paraformaldehyde in 50 ml. of ethanol are treated with 4.7 g. of N-o-chlorophenyl-piperazine hydrochloride and conc. hydrochloric acid (3 drops). The reaction mixture is boiled under reflux overnight. On cooling, the N-[3-(1-phenyl - 5 - methyl-4-pyrazolyl)-3-oxo-1-propyl]-N'-(2-chlorophenyl)-piperazine hydrochloride of the formula

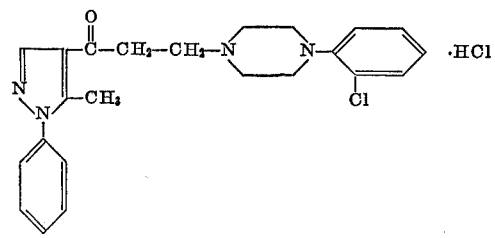

crystallizes out. After recrystallization from ethanol-ethyl acetate it melts at 218–220° C.

EXAMPLE 2

4 g. of 1-phenyl-4-acetyl-5-methyl-pyrazole and 2.7 g. of paraformaldehyde in 50 ml. ethanol are treated with 4.7 g. of N-(p-chlorophenyl)-piperazine dihydrochloride and conc. hydrochloric acid (4 drops). The reaction mixture is boiled under reflux overnight. On cooling, the N-[3 - (1-phenyl-5-methyl-4-pyrazolyl)-3-oxo-1-propyl]-N'-(4-chlorophenyl)-piperazine hydrochloride of the formula

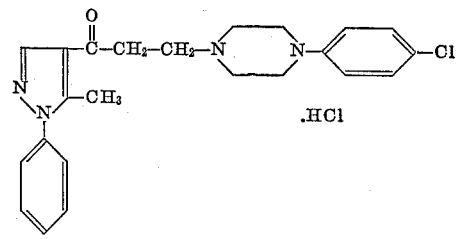

crystallizes out. On recrystallization from ethanol-ethyl acetate it melts at 233–234° C.

EXAMPLE 3

A solution of 5 g. of N-[3-(1-phenyl-5-methyl-4-pyrazolyl) - 3 - oxo-1-propyl]-N'-(2-chlorophenyl)piperazine-hydrochloride in 100 ml. of ethanol is hydrogenated over 0.2 g. of Adam's platinum oxide catalyst under 40 lbs./sq. inch pressure in Parr apparatus. After the theoretical uptake of hydrogen, the hydrogenated solution is filtered, evaporated to dryness and the residue recrystallized from methanol-ethyl acetate.

There is obtained the N-[3-(1-phenyl-5-methyl-4-pyrazol) - 3-hydroxy-1-propyl]-N'-(2-chlorophenyl)-piperazine-hydrochloride of the formula

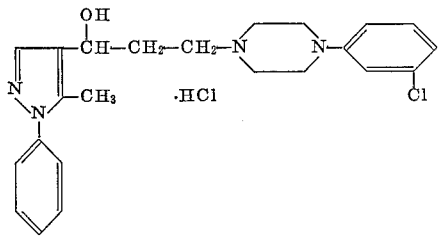

melting at 213–214° C.

EXAMPLE 4

A solution of 3 g. of N-[3-(1-phenyl-5-methyl-4-pyrazolyl)-3-oxo-1-propyl]-N'-(4-chloro-phenyl)-piperazine hydrochloride in 60 ml. of ethanol is hydrogenated over 0.3 g. of Adam's platinum oxide catalyst under 40 lbs./sq. inch pressure in Parr apparatus. After the theoretical uptake of hydrogen, the hydrogenated solution is filtered, evaporated to dryness and the residue recrystallized from methanol-ethyl acetate. There is obtained the N-[3-(1-phenyl - 5-methyl-4-pyrazol)-3-hydroxy-1-propyl]-N'-(4-chlorophenyl)-piperazine hydrochloride of the formula

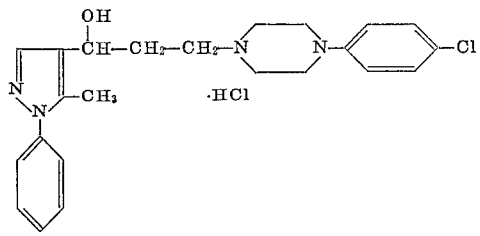

melting at 153–154° C.

EXAMPLE 5

2 g. of 1-phenyl-4-acetyl-5-methylpyrazole and 1.8 g. of paraformaldehyde in 30 ml. of ethanol are treated with 2.43 g. of N-(p-nitrophenyl)-piperazine hydrochloride and conc. hydrochloric acid (2 drops). The reaction mixture is boiled under reflux overnight. On cooling, a yellow crystalline product is obtained which is recrystallized from ethanol. The thus obtained N-[3-(1-phenyl-5-methyl - 4 - pyrazolyl)-3-oxo-1-propyl]-N'-(4-nitro-phenyl)-piperazine hydrochloride of the formula

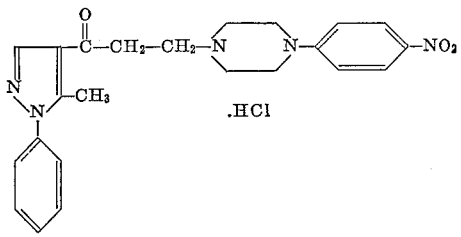

melts at 235° C. (dec.).

EXAMPLE 6

6 g. of 1-phenyl-4-acetyl-5-methylpyrazole and 5.4 g. of paraformaldehyde in 120 ml. of ethanol are treated with 9.06 g. of N-(m-trifluoromethyl-phenyl)-piperazine hydrochloride and conc. hydrochloric acid (4 drops). The reaction mixture is boiled under reflux overnight. On cooling, the N-[3-(1-phenyl-5-methyl-4-pyrazolyl)-3-oxo-1-propyl]-N'-(3-trifluoromethyl-phenyl)-piperazine hydrochloride of the formula

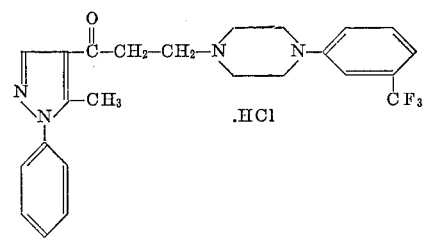

crystallizes out. It is recrystallized from methanol-ethyl acetate, M.P. 225° C. (dec.). The base regenerated from the above salt crystallizes from ethyl acetate-hexane, M.P. 145° C.

EXAMPLE 7

8 g. of 1-phenyl-4-acetyl-5-methylpyrazole and 7.2 g. of paraformaldehyde in 120 ml. of ethanol are treated with 10.49 g. of N-(p-fluorophenyl)-piperazine hydrochloride and conc. hydrochloric acid (8 drops). The reaction mixture is boiled under reflux for 24 hours. On cooling, a crystalline product is formed which is recrystallized from methanol-ethyl acetate. The thus obtained N-[3-(1-phenyl-5-methyl-4-pyrazolyl)-3-oxo - 1 - propyl]-N'-(4-fluoro-phenyl)-piperazine hydrochloride of the formula

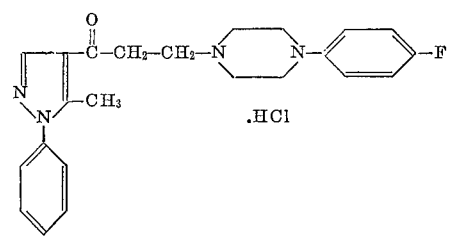

melts at 230° C. (dec.). The base regenerated from the above salt crystallizes from ethyl acetate-hexane, M.P. 160° C.

EXAMPLE 8

2 g. of 1-phenyl-4-acetyl-5-methylpyrazole and 1.8 g. of paraformaldehyde in 30 ml. of ethanol are treated with 2.82 g. of 2-methyl - 5 - chloro-phenyl-piperazine hydrochloride. The reaction mixture is boiled under reflux with conc. hydrochloric acid (4 drops) overnight. On cooling, the N-[3-(1-phenyl-5-methyl-4 - pyrazolyl) - 3 - oxo - 1-propyl]-N'-(2-methyl-5-chlorophenyl) - piperazine hydrochloride of the formula

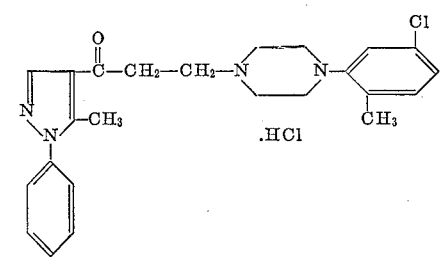

crystallizes out. It is recrystallized from methanol-ethyl acetate, M.P. 238–240° C. (dec.).

EXAMPLE 9

4 g. of 1-phenyl-4-acetyl-5-methyl pyrazole and 3.6 g. of paraformaldehyde in 60 ml. of ethanol are treated with 5.62 g. of N-(2-methyl-4-chlorophenyl)-piperazine hydrochloride and conc. hydrochloric acid (4 drops). The reaction mixture is boiled under reflux. On cooling, the N-[3-(1-phenyl-5-methyl-4 - pyrazolyl) - 3 - oxo - 1- propyl]-N'-(2-methyl-4-chloro-phenyl)-piperazine hydrochloride of the formula

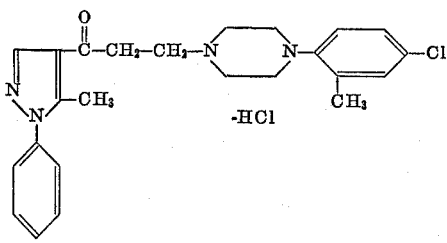

crystallizes.

It is recrystallized from methanol-ethyl acetate, M.P. 260° C. (dec.).

EXAMPLE 10

3 g. of 1-phenyl-4-acetyl-5-methylpyrazole, 2.7 g. of paraformaldehyde in 45 ml. of ethanol are treated with 4.5 g. of N-(2,4-dichlorophenyl)-piperazine hydrochloride and conc. hydrochloric acid (4 drops). The reaction mixture is boiled under reflux overnight. A solid material separates on cooling which is taken up in 20 ml. of water and basified with dilute sodium hydroxide solution. The base is extracted with ethyl acetate, the extract dried over anhydrous sodium sulfate and evaporated to dryness to afford a crystalline residue, which is recrystallized from ethyl acetate. The thus obtained N-[3-(1-phenyl-5-methyl-4-pyrazolyl)-3-oxo-1-propyl]-N' - (2,4 - dichlorophenyl)-piperazine of the formula

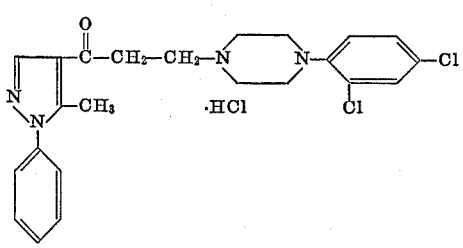

melts at 253° C.

EXAMPLE 11

2.5 g. of 1-(4-nitrophenyl)-4-acetyl-5-methyl pyrazole and 1.8 g. of paraformaldehyde in 30 ml. of ethanol are treated with 2.6 g. of N-(4-fluorophenyl)-piperazine hydrochloride and conc. hydrochloric acid (4 drops). The reaction mixture is boiled under reflux overnight. On cooling, the N-[3-(1-p-nitro-phenyl-5-methyl - 4 - pyrazolyl)-3-oxo-1-propyl]-N'-(4 - fluorophenyl) - piperazine hydrochloride of the formula

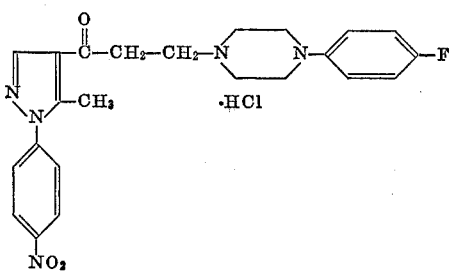

crystallizes. It is recrystallized from methanol-ethyl acetate, M.P. 225° C.

The starting material is obtained as follows:

78 g. of ethoxy-methylene-acetyl-acetone in 210 ml of tetrahydrofuran is cooled to 0° C. and a solution of 76 g. of p-nitro-phenyl-hydrazine in 600 ml. of tetrahydro-furan is added dropwise at 10° C. The reaction mixture is stirred at room temperature for 18 hours. The crystalline precipitate formed if filtered off and recrystallized from ethyl acetate. The thus obtained 1-p-nitrophenyl-4-acetyl-5-methyl-pyrazole melts at 190° C.

EXAMPLE 12

6 g. of 1-phenyl-4-acetyl-5-methyl-pyrazole and 5.4 g. paraformaldehyde in 90 ml. of ethanol are treated with 7.4 g. N-o-methyl-phenylpiperazine hydrochloride and conc. hydrochloric acid (4 drops). The reaction mixture is boiled under reflux overnight. On cooling, the N-[3-(1-phenyl - 5 - methyl-4-pyrazolyl)-3-oxo-1-propyl]-N'-(2-methylphenyl)-piperazine hydrochloride of the formula

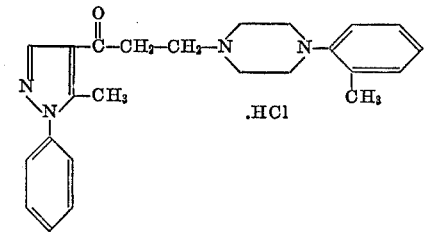

crystallizes out. After recrystallization from ethanol-ethyl acetate, it melts at 237° C. (dec.).

EXAMPLE 13

6 g. 1-phenyl-4-acetyl-5-methyl-pyrazole and 4 g. paraformaldehyde in 100 ml. of ethanol are treated with 5.3 g. N-p-methoxyphenyl-piperazine dihydrochloride and conc. hydrochloride acid (4 drops). The reaction mixture is boiled under reflux for 24 hours. On cooling, the N-[3-(1-phenyl-5 - methyl-4-pyrazolyl)-3-oxo-1-propyl]-N'-(4-methoxyphenyl) - piperazine hydrochloride crystallizes out in the form of its hemihydrate. It has the formula

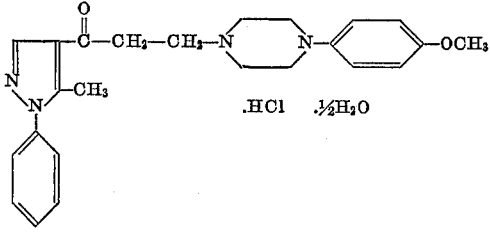

and melts at 218° C. (dec.).

EXAMPLE 14

6 g. of 1-phenyl-4-acetyl-5-methyl pyrazole and 5.4 g. paraformaldehyde in 90 ml. of ethanol are treated with 8 g. N-m-chlorophenyl piperazine dihydrochloride and conc. hydrochloric acid (4 drops). The reaction mixture is boiled under reflux overnight. On cooling, the N-[3-(1-phenyl - 5 - methyl-4-pyrazolyl)-3-oxo-1-propyl]-N'-(3-chlorophenyl)-piperazine hydrochloride of the formula

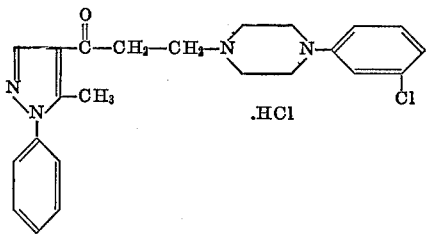

crystallizes out. After recrystallizations from ethanol-ethyl acetate, it melts at 225° C. (dec.).

EXAMPLE 15

6 g. 1-phenyl-4-acetyl-5-methyl-pyrazole and 4 g. paraformaldehyde in 100 ml. of ethanol are treated with 6.8 g. N-(2,6-dimethylphenyl)-piperazine hydrochloride and conc. hydrochloric acid (4 drops). The reaction mixture is boiled under reflux overnight. On cooling, the N-[3-(1- phenyl-5-methyl - 4 - pyrazolyl)-3-oxo-1-propyl]-N'-(2,6-dimethylphenyl)-piperazine hydrochloride of the formula

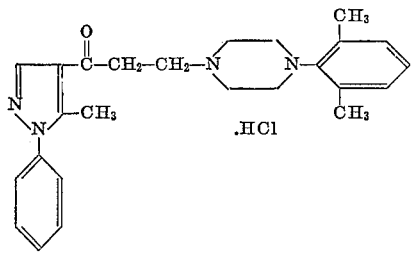

crystallizes out. After recrystallizations from ethanol-ether, it melts at 212° C. (dec.).

EXAMPLE 16

6 g. 1-phenyl-4-acetyl-5-methyl-pyrazole and 4 g. paraformaldehyde in 100 ml. of ethanol are treated with 5.3 g. N-o-methoxyphenyl piperazine hydrochloride and conc. hydrochloric acid (4 drops). The reaction mixture is boiled under reflux overnight. On cooling, the N-[3-(1-phenyl - 5 - methyl - 4-pyrazolyl)-3-oxo-1-propyl]-N'-(2-methoxyphenyl)-piperazine hydrochloride crystallizes out as its hemihydrate. It has the formula

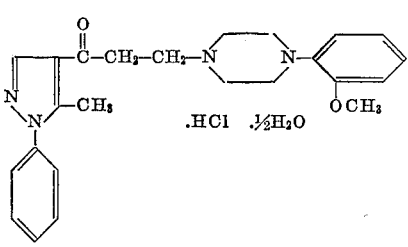

and melts at 206° C. (dec.).

EXAMPLE 17

6 g. 1-phenyl-4-acetyl-5-methyl-pyrazole and 4 g. paraformaldehyde in 140 ml. of ethanol are treated with 6.8 g. N-(2,3-dimethylphenyl)-piperazine hydrochloride and conc. hydrochloric acid (4 drops). The reaction mixture is boiled under reflux overnight. On cooling, the N-[3-(1-phenyl - 5 - methyl-4-pyrazolyl)-3-oxo-1-propyl]-N'-(2,3-dimethylphenyl)-piperazine hydrochloride crystallizes out as its hemihydrate. It has the formula

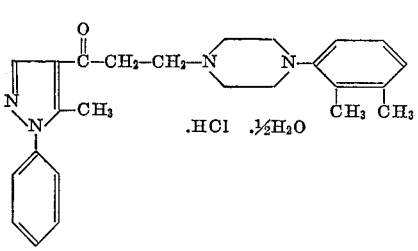

and melts at 245° C. (dec.).

EXAMPLE 18

6 g. 1-phenyl-4-acetyl-5-methyl-pyrazole and 5.4 g. paraformaldehyde in 90 ml. ethanol are treated with 6.5 g. N-o-fluorophenyl piperazine hydrochloride and conc. hydrochloric acid (4 drops). The reaction mixture is boiled under reflux overnight. On cooling, the N-[3-(1-phenyl-5 - methyl - 4 - pyrazolyl)-3-oxo-1-propyl]-N'-(2-fluorophenyl)-piperazine hydrochloride of the formula

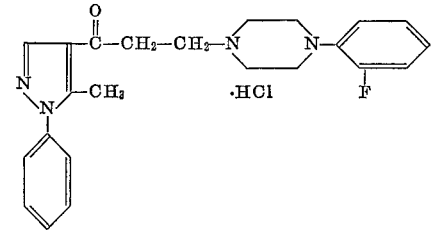

crystallizes out. After recrystallizations from ethanol-ether, it melts at 210° C. (dec.).

EXAMPLE 19

6 g. 1-phenyl-4-acetyl-5-methyl-pyrazole and 5.4 g. paraformaldehyde in 90 ml. of ethanol are treated with 8.8 g. N-(2,5-dimethoxyphenyl) piperazine hydrochloride and conc. hydrochloric acid (4 drops). The reaction mixture is boiled under reflux overnight. On cooling, N-[3-(1 - phenyl - 5-methyl-4-pyrazolyl)-3-oxo-1-propyl]-N'-(2,5-dimethoxyphenyl)-piperazine hydrochloride crystallizes out as its trihydrate. It has the formula

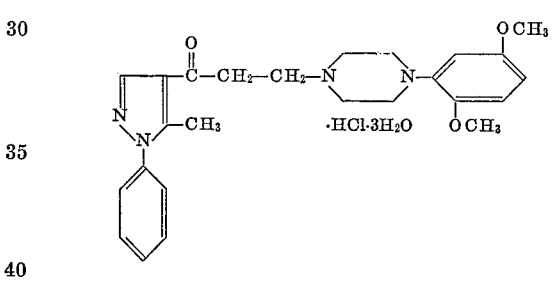

It melts at 203° C. (dec.).

EXAMPLE 20

6 g. 1-phenyl-4-acetyl-5-methyl-pyrazole and 4 g. paraformaldehyde in 100 ml. of ethanol are treated with 9 g. N - (o - trifluoromethylphenyl)piperazine hydrochloride and conc. hydrochloric acid (4 drops). The reaction mixture is boiled under reflux overnight. On cooling, the N-[3-(1-phenyl - 5 - methyl-4-pyrazolyl)-3-oxo-1-propyl]-N'-(2-trifluoromethylphenyl)-piperazine hydrochloride of the formula

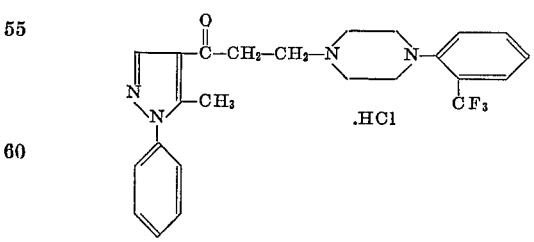

crystallizes out. After recrystallizations from ethanol-ethyl acetate, it melts at 210° C. (dec.).

EXAMPLE 21

8.4 g. of 1-(p-bromophenyl)-4-acetyl - 5 - methyl-pyrazole and 4 g. paraformaldehyde in 100 ml. of ethanol are treated with 5.3 g. N-(2-methoxyphenyl)-piperazine hydrochloride and conc. hydrochloric acid (4 drops). The reaction mixture is boiled under reflux overnight. On cooling, the N - [3 - (1 - p - bromophenyl - 5 - methyl-4- pyrazolyl) - 3 - oxo - 1 - propyl]-N'-(2-methoxyphenyl)-piperazine hydrochloride of the formula

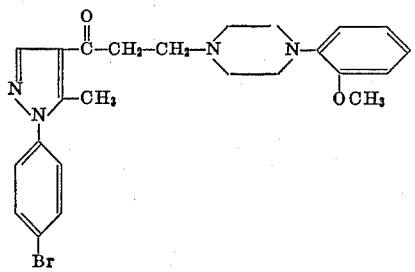

crystallizes out. After recrystallizations from methanol-ethyl acetate, it melts at 198–200° C. (dec.).

The starting material is obtained as follows:

52 g. of ethoxy-methylene-acetyl-acetone in 200 ml. of ether is cooled to 0° C. and a solution of 62 g. of p-bromophenyl hydrazine in 400 ml. of ether is added dropwise at 10° C. The reaction mixture is stirred at room temperature for 18 hours. The crystalline precipitate formed is filtered off and recrystallized from ether-petroleum ether. The thus obtained 1-p-bromophenyl-4-acetyl-5-methyl-pyrazole melts at 105° C.

EXAMPLE 22

4.2 g. 1-(p-bromophenyl)-4 - acetyl-5-methyl-pyrazole and 2.1 g. paraformaldehyde in 50 ml. of ethanol are treated with 3.8 g. N-(p-fluorophenyl)-piperazine hydrochloride and conc. hydrochloric acid (4 drops). The reaction mixture is boiled under reflux overnight. On cooling, the N-[3-(1-p-bromophenyl-5-methyl-4-pyrazolyl)-3-oxo-1 - propyl]-N'-(4-fluorophenyl)-piperazine hydrochloride of the formula

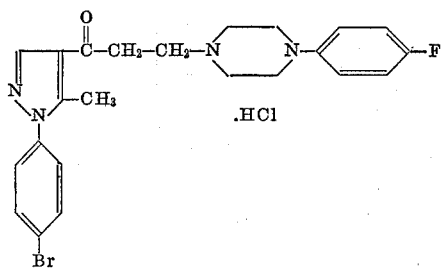

crystallizes out. After recrystallization from ethanol-ethyl acetate, it melts at 212° C. (dec.).

EXAMPLE 23

2.2 g. 1 - (p - methylphenyl) - 4 - acetyl - 5 - methyl-pyrazole and 1.6 g. paraformaldehyde in 30 ml. of ethanol are treated with 2.2 g. N - (2 - fluorophenyl)-piperazine hydrochloride and conc. hydrochloric acid (4 drops). The reaction mixture is boiled under reflux overnight. On cooling, the N - [3 - (1 - p - methylphenyl-5 - methyl - 4 - pyrazolyl) - 3 - oxo - 1 - propyl]-N'-(2 - fluorophenyl) - piperazine hydrochloride of the formula

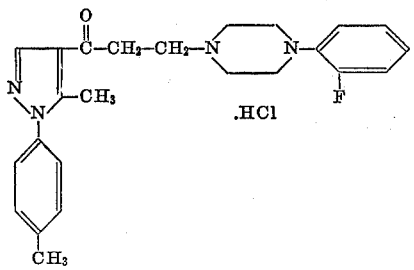

crystallizes out. After recrystallization from ethanol, it melts at 230° C. (dec.).

The starting material is obtained as follows:

30 g. of ethoxy-methylene-acetyl-acetone in 100 ml. of ether is cooled to 0° C. and a solution of 22.5 g. of p-methylphenyl-hydrazine in 250 ml. ether is added dropwise at 10° C. The reaction mixture is stirred at room temperature for 18 hours. The crystalline precipitate formed is filtered off and recrystallized from ether-petroleum ether. The thus obtained 1-p-methylphenyl-4-acetyl-5-methyl-pyrazole melts at 97° C.

EXAMPLE 24

4.3 g. 1 - (p - methylphenyl) - 4 - acetyl - 5 - methyl-pyrazole and 3.2 g. paraformaldehyde in 75 ml. of ethanol are treated with 3.2 g. N-(o-methoxyphenyl)-piperazine hydrochloride and conc. hydrochloric acid (4 drops). The reaction mixture is boiled under reflux overnight. On cooling, the N - [3 - (1 - p - methylphenyl-5-methyl - 4 - pyrazolyl) - 3 - oxo - 1 - propyl] - N' - (2-methoxyphenyl)-piperazine hydrochloride of the formula

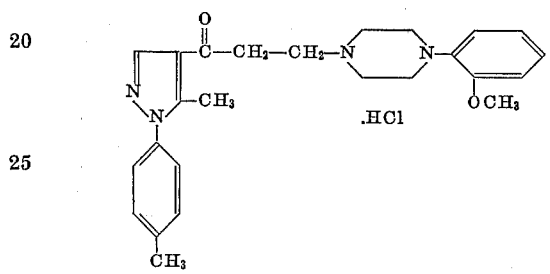

crystallizes out. After recrystallization from ethanol, it melts at 213° C. (dec.).

EXAMPLE 25

A solution of 5 g. of N - [3 - (1 - phenyl - 5 - methyl-4 - pyrazolyl) - 3 - oxo - 1 - propyl] - N' - (2 - methylphenyl)-piperazine hydrochloride in 100 ml. 50% aq. methanol is dropwise added to a solution of 0.5 g. sodium borohydride in 60 ml. 50% aq. methanol, at room temperature. After the addition, the reaction mixture is stirred for 30 min. at room temperature, then stirring is continued at 45–50° for 2 hours and finally it was boiled under reflux for 15 minutes. On cooling, the N - [3 - (1 - phenyl - 5 - methyl - 4 - pyrazolyl) - 3 - hydroxy - 1 - propyl] - N' - (2 - methylphenyl) - piperazine of the formula

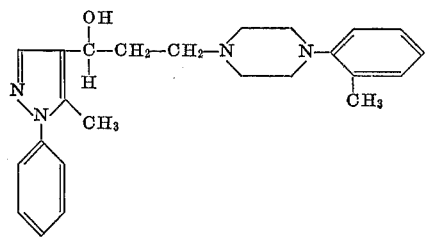

crystallizes out. It is recrystallized from ethanol and melts at 143° C. The hydrochloride salt prepared from the above base crystallizes from methanol-ethyl acetate-ether, M.P. 189° C.

EXAMPLE 26

A solution of 2 g. of N - [3 - (1 - phenyl - 5 - methyl-4 - pyrazolyl) - 3 - oxo - 1 - propyl] - N' - (4 - fluorophenyl) - piperazine hydrochloride in 25 ml. 50% aq. methanol is added dropwise under stirring at room temperature to a solution of 0.2 g. sodium borohydride in 25 ml. 50% aq. methanol. After the addition, the reaction mixture is stirred for 30 min. at room temperature, then stirring is continued at 45–50° for 2 hours and finally it was boiled under reflux for 15 minutes. On cooling, the N - [3 - (1 - phenyl - 5 - methyl - 4 - pyrazolyl) - 3 - hydroxy - 1 - propyl] - N' - (4 - fluorophenyl) - piperazine of the formula

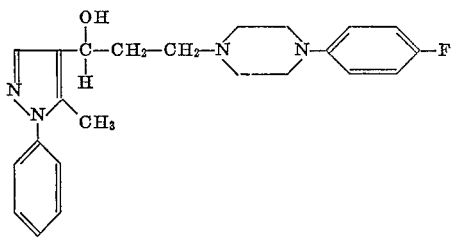

crystallizes out. It is recrystallized from aq. methanol and melts at 138° C. The dihydrochloride salt prepared from the above base crystallizes as a monohydrate from methanol-ethyl acetate, M.P. 206° C.

EXAMPLE 27

A solution of 2 g. of N - [3 - (1 - phenyl - 5 - methyl-4 - pyrazolyl) - 3 - oxo - 1 - propyl] - N' - (2 - trifluoromethylphenyl) - piperazine hydrochloride in 50 ml. 50% aq. methanol is added dropwise under stirring at room temperature to a solution of 0.2 g. sodium borohydride in 25 ml. 50% aq. methanol. After the addition, the reaction mixture is stirred for 30 minutes at room temperature, then the stirring is continued at 45–50° for 2 hours and finally it is boiled under reflux for 15 minutes. On cooling, the N - [3 - (1 - phenyl - 5 - methyl - 4 - pyrazolyl) - 3 - hydroxy - 1 - propyl] - N' - (2 - trifluoromethylphenyl) - piperazine of the formula

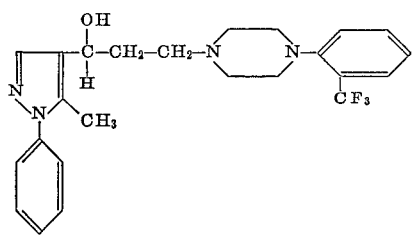

crystallizes out. It is recrystallized from aq. ethanol and melts at 115°. The hydrochloride salt prepared from the above base, crystallizes from ethyl acetate-isopropanol-ether, M.P. 210° C.

EXAMPLE 28

A solution of 2 g. of N-[3-(1-phenyl-5-methyl-4-pyrazolyl)-3-oxo-1-propyl]-N'-(2-methoxyphenyl) - piperazine hydrochloride hemihydrate in 25 ml. 50% aq. methanol is added dropwise under stirring at room temperature to a solution of 0.2 g. sodium borohydride in 25 ml. 50% aq. methanol. After the addition, the reaction is stirred for 30 minutes at room temperature, then the stirring is continued at 45–50° for 2 hours and finally it is boiled under reflux for 15 minutes. On cooling, the N-[3-(1-phenyl-5-methyl-4-pyrazolyl)-3-hydroxy-1-propyl]-N' - (2 - methoxyphenyl)-piperazine of the formula

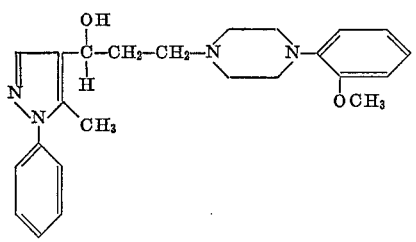

crystallizes out. It is recrystallized from ethanol and melts at 160° C.

EXAMPLE 29

A solution of 2 g. of N-[3-(1-phenyl-5-methyl-4-pyrazolyl)-3-oxo-1-propyl]-N'-(2-fluorophenyl)-piperazine hydrochloride in 35 ml. 50% aq. methanol is added dropwise under stirring at room temperature to a solution of 0.2 g. sodium borohydride in 25 ml. 50% aq. methanol. After the addition, the reaction mixture is stirred for 30 minutes at room temperature, then the stirring is continued at 45–50° for 2 hours and finally it is boiled for 15 minutes. On cooling, the N-[3-(1-phenyl-5-methyl-4-pyrazolyl)-3-hydroxy-1-propyl]-N'-(2-fluorophenyl)-piperazine of the formula

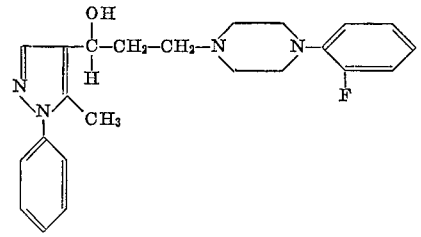

crystallizes out. It is recrystallized from 60% aq. methanol and melts at 118° C. (dec.).

EXAMPLE 30

A solution of 700 mg. N-[3-(1-p-nitro-phenyl-5-methyl-4-pyrazolyl)-3-oxo-1-propyl] - N' - (4 - fluorophenyl)-piperazine hydrochloride in 50 ml. of 50% aq. methanol is dropwise added under stirring at room temperature to a solution of 70 mg. sodium borohydride in 20 ml. 50% aq. methanol. After the addition, the reaction mixture is stirred for 30 minutes at room temperature and then stirred at 45–50° C. for 2 hours and finally boiled for 15 minutes. It is allowed to stand overnight as such and the solvent is evaporated to dryness under reduced pressure. The residue crystallizes from methanol to afford N-[3-(1-p-nitro-phenyl-5-methyl-4 - pyrazolyl) - 3 - hydroxy-1-propyl]-N'-(4-fluorophenyl) - piperazine of the formula

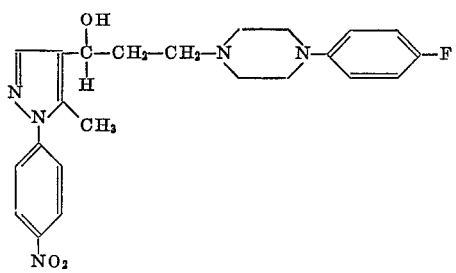

which melts at 165° C.

EXAMPLE 31

A solution of 4 g. N-[3-(1-phenyl-5-methyl-4-pyrazolyl)-3-oxo-1-propyl] - N' - (3 - trifluoromethylphenyl)-piperazine hydrochloride in 80 ml. 50% aq. methanol is added dropwise under stirring at room temperature to a solution of 0.4 g. sodium borohydride in 30 ml. 50% aq. methanol. After the addition, the reaction mixture is stirred at 45–50° for 2 hours and finally it is boiled for 15 minutes. On cooling, the N-[3-(1-phenyl-5-methyl-4-pyrazolyl)-3-hydroxy-propyl] - N' - (3-trifluoromethylphenyl)-piperazine of the formula

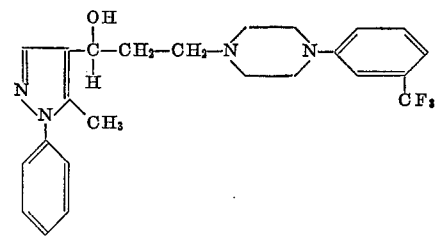

crystallizes out. It is recrystallized from ethanol and melts at 122° C.

EXAMPLE 32

A solution of 1.5 g. of N-[3-(1-phenyl-5-methyl-4-pyrazolyl)-3-oxo-1-propyl] - N' - ( 4 -methoxyphenyl)-piperazine hydrochloride hemihydrate in 25 ml. 50% aqueous methanol is added dropwise under stirring at room temperature to a solution of 0.15 g. sodium borohydride in 50 ml. 50% aqueous methanol. After the addition, the reaction is stirred for 30 minutes at room temperature, then the stirring is continued at 45–50° for 2 hours and finally it is boiled under reflux for 15 minutes. On cooling, N-[3-(1-phenyl-5-methyl-4-pyrazolyl) - 3 - hydroxy-1-propyl] - N' - (4 - methoxyphenyl)-piperazine of the formula

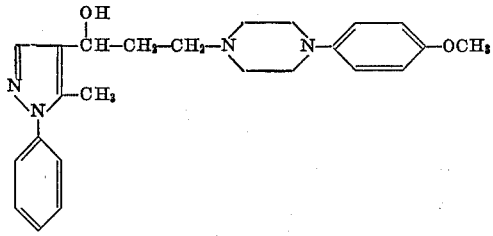

crystallizes out. It is recrystallized from ethanol and melts at 150° C.

EXAMPLE 33

6 g. of 1-phenyl-4-acetyl-5-methyl-pyrazole and 5.4 g. paraformaldehyde in 90 ml. of ethanol are treated with 7.5 g. of N-(p-methylphenyl)-piperazine hydrochloride and conc. hydrochloric acid (4 drops). The reaction mixture is boiled under reflux overnight. On cooling, the N-[3-(1-phenyl-5-methyl - 4 - pyrazolyl)-3-oxo-1-propyl]-N'-(4-methylphenyl)-piperazine hydrochloride of the formula

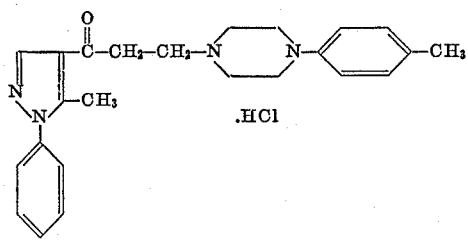

crystallizes out. After recrystallization from ethanol-ether, it melts at 220° C. (dec.).

EXAMPLE 34

6 g. 1-phenyl-4-acetyl-5-methyl pyrazole and 5.4 g. paraformaldehyde in 100 ml. of ethanol are treated with 6.85 g. N-(2,5-dimethylphenyl)-piperazine hydrochloride and conc. hydrochloric acid (4 drops). The reaction mixture is boiled under reflux overnight. On cooling, the N-[3-(1-phenyl - 5 - methyl-4-pyrazolyl)-3-oxo-1-propyl]-N'-(2,5-dimethylphenyl)-piperazine hydrochloride of the formula

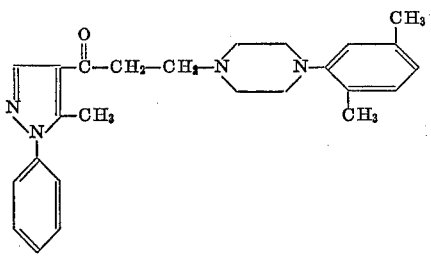

crystallizes out. After recrystallization from methanol-ethyl acetate, it melts at 220° C. (dec.).

EXAMPLE 35

8 g. 1-phenyl-4-acetyl-5-methyl pyrazole and 7.2 g. paraformaldehyde in 120 ml. of ethanol are treated with 9.4 g. N-phenylpiperazine dihydrochloride and conc. hydrochloric acid (4 drops). The reaction mixture is boiled under reflux overnight. The solvent is evaporated off and the residue is treated with a saturated solution of sodium bicarbonate. The base is extracted with ethyl acetate and the extract is dried over anhydrous potassium carbonate and the solvent removed. The residue is dissolved in benzene and filtered through alumina column to give pure base of the formula

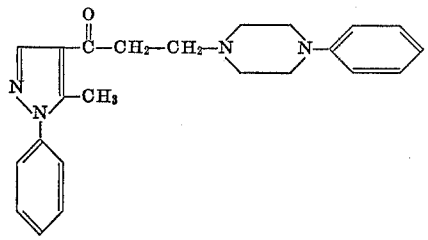

which crystallizes out on cooling. After recrystallizations from methanol, it melts at 150° C. (dec.).

EXAMPLE 36

4.4 g. 1-(p-fluorophenyl)-4-acetyl - 5 - methyl-pyrazole and 3 g. paraformaldehyde in 65 ml. of ethanol are treated with 5 g. N-(2-methylphenyl)-piperazine hydrochloride and conc. hydrochloric acid (4 drops). The reaction mixture is boiled under reflux overnight. On cooling, the N-[3-(1-p-fluorophenyl - 5 - methyl-4-pyrazolyl)-3-oxo-1-propyl]-N'-(2-methylphenyl)-piperazine hydrochloride of the formula

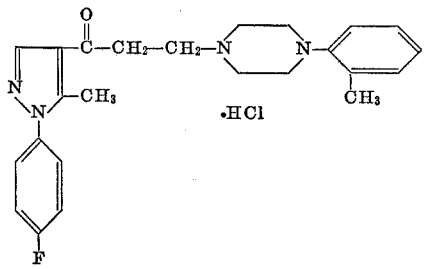

crystallizes out. After recrystallization from methanol-ethyl acetate it melts at 225° C. (dec.).

The starting material is obtained as follows:
7.8 g. of ethoxy-methylene-acetyl acetone in 60 ml. of ether is cooled to 0° C. and a solution of 6.3 g. of p-fluorophenyl hydrazine in 40 ml. of ether is added dropwise at 10° C. The reaction mixture is stirred at room temperature for 18 hours. The crystalline precipitate formed, is filtered off and recrystallized from ether-petroleum ether. The thus formed 1-p-fluorophenyl-4-acetyl-5-methyl-pyrazole melts at 83° C.

EXAMPLE 37

2.5 g. 1-(p-nitrophenyl)-4-acetyl-5-methyl-pyrazole and 1.2 g. paraformaldehyde in 40 ml. of ethanol are treated with 2.2 g. N-(2-methylphenyl)-piperazine hydrochloride and conc. hydrochloric acid (4 drops). The reaction mixture is boiled under reflux overnight. On cooling, the N-[3-(1-p-nitrophenyl - 5 - methyl-4-pyrazolyl)-3-oxo-1-propyl]-N'-(2-methylphenyl)-piperazine hydrochloride of the formula

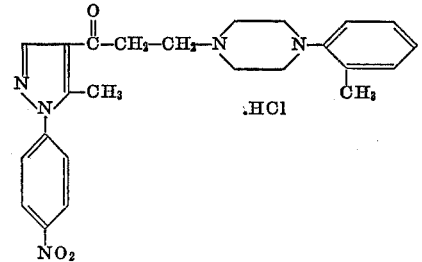

crystallizes out. After recrystallization from ethanol, it melts at 178° C. (dec.).

EXAMPLE 38

6 g. of 1-phenyl-4-acetyl-5-methyl pyrazole and 4.8 g. paraformaldehyde in 100 ml. of ethanol are treated with 8.9 g. N-(2-ethylphenyl)-piperazine hydrochloride and conc. hydrochloric acid (4 drops). The reaction mixture is boiled under reflux overnight. On cooling, the N-[3-(1-phenyl-5-methyl-4-pyrazolyl)-3-oxo-1-propyl] - N' - (2-ethylphenyl)-piperazine hydrochloride of the formula

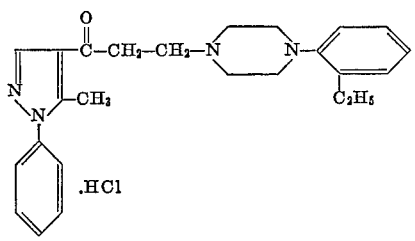

crystallizes out. After recrystallization from ethanol-ethyl acetate, it melts at 206° C. (dec.).

EXAMPLE 39

4.2 g. of 1-(p-bromophenyl)-4-acetyl-5-methyl-pyrazole and 2.4 g. of paraformaldehyde in 60 ml. of ethanol are treated with N-(2-ethylphenyl)-piperazine hydrochloride and conc. hydrochloric acid (4 drops). The reaction mixture is boiled under reflux overnight. On cooling, the N-[3 - (1-p-bromophenyl-5-methyl-4-pyrazolyl) - 3 - oxo-1-propyl]-N'-(2-ethylphenyl)-piperazine hydrochloride of the formula

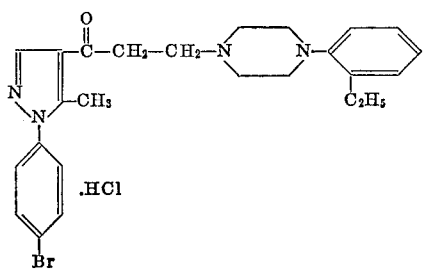

crystallizes out. After recrystallization from methanol-ethyl acetate, it melts at 204° C. (dec.).

EXAMPLE 40

4.2 g. of 1-(p-bromophenyl)-4-acetyl-5-methyl-pyrazole and N-(2-fluorophenyl)-piperazine hydrochloride and conc. hydrochloric acid (4 drops). The reaction mixture is boiled under reflux overnight. On cooling, the N-[3-(1-p-bromophenyl-5-methyl-4-pyrazolyl) - 3 - oxo - 1-propyl]-N'-(2-fluorophenyl)-piperazine hydrochloride of the formula

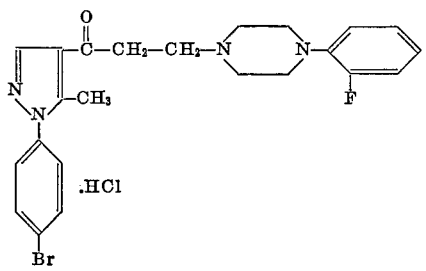

crystallizes out. After recrystallization from ethanol-ether acetate, it melts at 214° C. (dec.).

EXAMPLE 41

4.2 g. 1-(p-bromophenyl)-4-acetyl-5-methyl-pyrazole and 2.4 g. paraformaldehyde in 60 ml. of ethanol are treated with 3.5 g. N-(2-chlorophenyl)-piperazine hydrochloride and conc. hydrochloric acid (4 drops). The reaction mixture is boiled under reflux overnight. On cooling, the N-[3-(1-p-bromophenyl-5-methyl-4-pyrazolyl)-3- oxo-1-propyl]-N'-(2-chlorophenyl)-piperazine hydrochloride of the formula

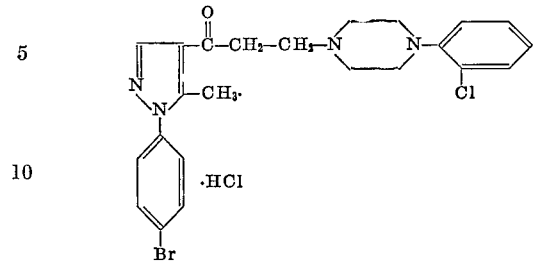

crystallizes out. After recrystallization from methanol-ethyl acetate, it melts at 202° C. (dec.).

EXAMPLE 42

A solution of 3 g. of N-[3-(1-phenyl-5-methyl-4-pyrazolyl)-3-oxo-1-propyl] - N' - (3-chlorophenyl)-piperazine hydrochloride in 40 ml. 50% aq. methanol is added dropwise under stirring at room temperature to a solution of 0.30 g. sodium borohydride in 35 ml. 50% aq. methanol. After the addition, the reaction is stirred for 30 minutes at room temperature, then the stirring is continued at 45–50° for 2 hours and finally it is boiled under reflux for 15 minutes. On cooling, N-[3-(1-phenyl-5-methyl-4-pyrazolyl)-3-hydroxy-1-propyl] - N' - (3-chlorophenyl)-piperazine of the formula

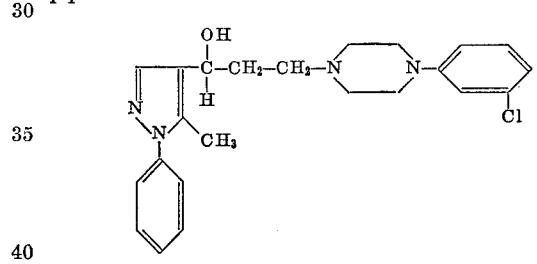

crystallizes out. It is recrystallized from 50% aq. methanol and melts at 120° C.

EXAMPLE 43

2 g. of 1-phenyl-4-acetyl-5-methyl-pyrazole and 1.6 g. paraformaldehyde in 30 ml. of ethanol are treated with 2.5 g. N-(3-fluorophenyl)-piperazine hydrochloride and conc. hydrochloric acid (4 drops). The reaction mixture is boiled under reflux overnight. On cooling, the N-[3-(1-phenyl-5-methyl-4-pyrazolyl)-3-oxo-1-propyl] - N' - (3-fluorophenyl)-piperazine hydrochloride hemihydrate of the formula

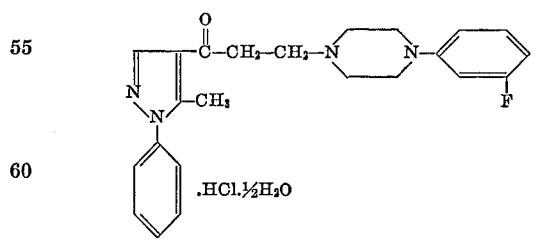

crystallizes out. After recrystallization from isopropanol-ethylacetate, it melts at 200° C. (dec.).

EXAMPLE 44

4.7 g. of N-[3-(1-p-nitrophenyl-5-methyl-4-pyrazolyl)-3-oxo-1-propyl]-N'-(4 - fluorophenyl)-piperazine hydrochloride dissolved in 500 ml. of ethanol is hydrogenated over 0.7 g. of 10% palladium-carbon catalyst at room temperature and pressure. After the theoretical uptake of hydrogen, the hydrogenated solution is filtered, evaporated to dryness and the residue is recrystallized from methanol-ethyl acetate.

There is thus obtained the N-[3-(1-p-aminophenyl-5-methyl-4-pyrazolyl) - 3 - oxo-1-propyl]-N'-(4-fluorophenyl)piperazine hydrochloride of the formula

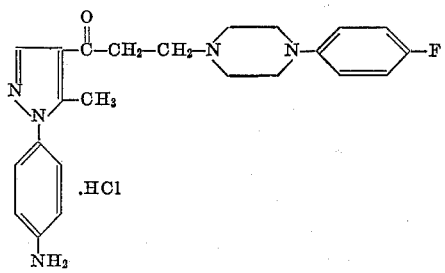

melting at 203° C. (dec.).

EXAMPLE 45

2.2 g. 1(p-fluorophenyl)-4-acetyl-5-methyl - pyrazole and 1.8 g. paraformaldehyde in 35 ml. of ethanol are treated with N-(2-methoxyphenyl)-piperazine hydrochloride and conc. hydrochloric acid (4 drops). The reaction mixture is boiled under reflux overnight. On cooling, the N-[3-(1-p-fluorophenyl - 5 - methyl-4-pyrazolyl)-3-oxo-1-propyl]-N'-(2methoxyphenyl)piperazine hydrochloride of the formula

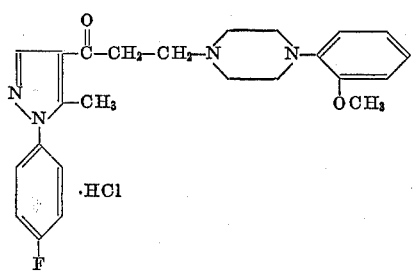

crystallizes out. After recrystallization from isopropanol-ethyl acetate, it melts at 235° C. (dec.).

EXAMPLE 46

1.2 g. 1-(p-fluorophenyl)-4-acetyl-5-methyl-pyrazole and 0.9 g. paraformaldehyde in 35 ml. of ethanol are treated with N-(2-chlorophenyl)-piperazine hydrochloride and conc. hydrochloric acid (4 drops). The reaction mixture is boiled under reflux overnight. On cooling, the N-[3-(1-p-fluorophenyl - 5 - methyl-4-pyrazolyl)-3-oxo-1-propyl]-N'-(2chlorophenyl)piperazine hydrochloride of the formula

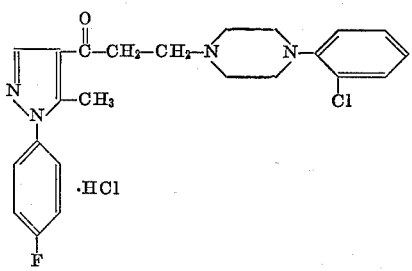

crystallized out. After recrystallization from isopropanol-ethyl acetate, it melts at 238° (dec.).

EXAMPLE 47

8.4 g. of 1-(β-hydroxyethyl)-4-acetyl-5-methyl-pyrazole and 8 g. of paraformaldehyde in 200 ml. of ethanol are treated with 12.5 g. of N-(2-methylphenyl)-piperazine hydrochloride and conc. hydrochloric acid (4 drops). The reaction mixture is boiled under reflux overnight. On cooling, the N-[3-(1-β-hydroxyethyl-5-methyl-4-pyrazolyl)-3-oxo-1-propyl]-N'-(2 - methylphenyl) - piperazine hydrochloride of the formula

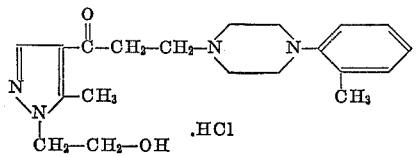

crystallizes out. After recrystallizations from isopropanol-ethyl acetate, it melts at 200° C. (dec.).

The starting material is obtained as follows:

155 g. of ethoxy-methylene-acetyl acetone in 650 ml. of chloroform is cooled to 0° C. and a solution of 75 g. of β-hydroxyethyl hydrazine in 600 ml. of chloroform is added dropwise at 10° C. The reaction mixture is stirred at room temperature for 18 hours. The crystalline precipitate formed is filtered off and recrystallized from ethyl acetate. The thus obtained 1-(β-hydroxyethyl)-4-acetyl-5-methyl-pyrazole melts at 130° C.

EXAMPLE 48

5 g. of 1-(β-hydroxyethyl)-4-acetyl-5-methyl-pyrazole and 4.8 g. of paraformaldehyde in 125 ml. of ethanol are treated with 8.8 g. of N-(2-methoxyphenyl)-piperazine hydrochloride and conc. hydrochloric acid (4 drops). The reaction mixture is boiled under reflux overnight. On cooling, the N-[3-(1-β-hydroxyethyl-5-methyl-4-pyrazolyl)-3-oxo - 1 - propyl]-N'-(2-methoxyphenyl)-piperazine hydrochloride of the formula

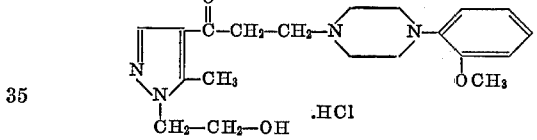

crystallizes out. After recrystallizations from ethyl acetate, it melts at 215–6° C. (dec.).

EXAMPLE 49

2 g. of N-[3-(1-phenyl-5-methyl-4-pyrazolyl)-3-hydroxy-1-propyl]-N'-(2-methoxyphenyl)-piperazine is dissolved in 75 ml. tetrahydrofuran. This solution was treated with 0.5 g. acetyl chloride and pyridine (1 drop). The reaction mixture was boiled under reflux for 4 hours and set aside for 18 hours at room temperature when N-[3-(1-phenyl - 5 - methyl-4-pyrazolyl)-3-acetoxy-1-propyl]-N'-(2-methoxyphenyl)-piperazine hydrochloride monohydrate of the formula

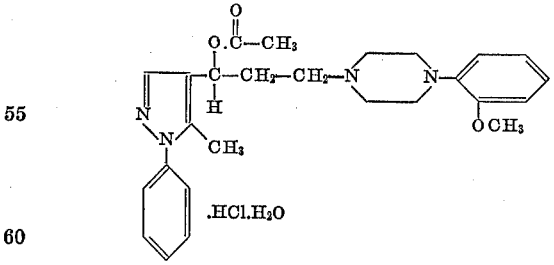

crystallizes out. After recrystallization from methylene chloride, it melts at 200° C. (dec.).

EXAMPLE 50

5.75 g. of N - [3 - (1 - phenyl - 5 - methyl - 4-pyrazolyl) - 3 - hydroxy - propyl] - N' - (2 - methylphenyl) - piperazine is dissolved in 275 ml. of dry benzene and dry hydrogen chloride gas is passed until pH 2, stirred for 15 minutes and 5.4 g. of thionylchloride in 180 ml. of dry benzene is quickly added. The reaction mixture is boiled under reflux for 4½ hours and thereafter the excess of thionyl chloride and benzene is distilled off completely. The residue is dissolved in 120 ml. of absolute ethanol and the solution cooled to 10°

C. A solution of 2.3 g. sodium in 60 ml. of absolute ethanol similarly cooled is added dropwise at 5°–10° C. to the reaction mixture. It is stirred for 15 minutes at room temperature and later boiled under reflux for 1 hour. After cooling, the sodium chloride formed is filtered off and the filtrate evaporated to dryness. The residue is dissolved in isopropanol and dry hydrogen chloride is passed through this solution until pH 4. A crystalline precipitate is obtained on cooling. This is recrystallized from methanol-ether to afford the N - [3 - (1-phenyl - 5 - methyl - 4 - pyrazolyl) - 3 - ethoxy - 1-propyl] - N' - (2 - methylphenyl) - piperazine hydrochloride of the formula

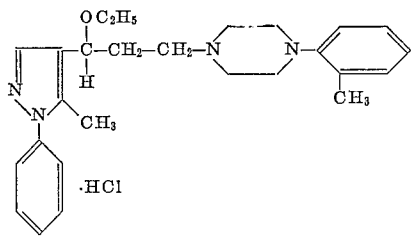

which melts at 225° C. (dec.).

EXAMPLE 51

8.4 g. of 1 - (β - hydroxyethyl) - 4 - acetyl - 5 - methylpyrazole and 8 g. of paraformaldehyde in 200 ml. of ethanol are treated with 11.6 g. of N - (2 - chlorophenyl)-piperazine hydrochloride and conc. hydrochloric acid (4 drops). The reaction mixture is boiled under reflux overnight. On cooling, the N - [3 - (1 - β - hydroxyethyl-5 - methyl - 4 - pyrazolyl) - 3 - oxo - 1 - propyl]-N'-(2-chlorophenyl)-piperazine hydrochloride monohydrate of the formula

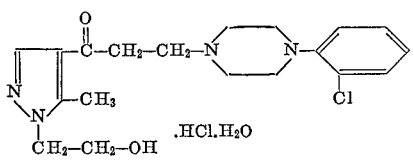

crystallizes out. After recrystallizations from ethyl acetate-ether it melts at 200° C. (dec.).

EXAMPLE 52

4 g. of 1 - (β - hydroxyethyl) - 4 - acetyl - 5-methylpyrazole and 4 g. of paraformaldehyde in 75 ml. of ethanol is treated with 5 g. of N - (2 - fluorophenyl)-piperazine hydrochloride and conc. hydrochloric acid (3 drops). The reaction mixture is boiled under reflux overnight. On cooling, the product crystallizes out. It is recrystallized from ethyl acetate. The thus obtained N-[3 - (1 - β - hydroxyethyl - 5 - methyl - 4 - pyrazolyl)-3 - oxo - 1 - propyl] - N' - (2 - fluorophenyl) - piperazine hydrochloride hemihydrate of the formula

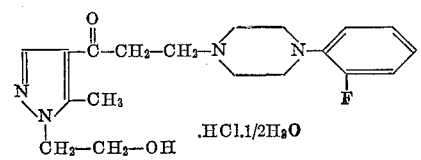

melts at 165° C. (dec.).

EXAMPLE 53

A solution of 3.8 g. of N - [3 - (1 - p - bromophenyl-5 - methyl - 4 - pyrazolyl) - 3 - oxo - 1 - propyl] - N'-(4 - fluorophenyl) - piperazine hydrochloride in 100 ml. of 50% aq. methanol is dropwise added to a solution of 0.38 g. of sodium borohydride in 50 ml. 50% aq. methanol at room temperature. After the addition, the reaction mixture is stirred for 30 mins. at room temperature, the stirring is continued at 45–50° for 1 hour and it is boiled under reflux for 15 minutes. On cooling, the N - [3 - (1 - p - bromophenyl - 5 - methyl - 4 - pyraz-olyl) - 3 - hydroxy - 1 - propyl] - N' - (4 - fluorophenyl)-piperazine of the formula

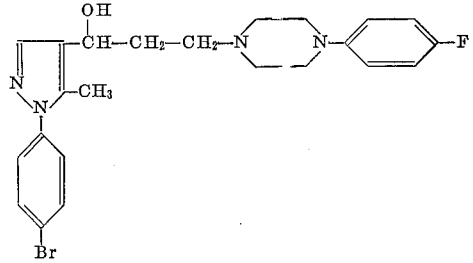

crystallizes out. After recrystallizations from ethanol-water, it melts at 185° C.

EXAMPLE 54

2 g. of 1 - phenyl - 4 - acetyl - 5 - methylpyrazole and 1.45 g. of paraformaldehyde in 25 ml. of ethanol is treated with 3.7 g. of N - (3,5 - bis - trifluoromethylphenyl) - piperazine dihydrochloride and conc. hydrochloric acid (4 drops). The reaction mixture is boiled under reflux overnight. On cooling at 0° for 40 days, a hygroscopic solid is obtained. This is dissolved in 20 ml. water, basified with 10% sodium carbonate and extracted into ether. The ethereal extract is dried over anhydrous potassium carbonate and evaporated off to dryness. The residue is recrystallized from methanol-isopropanol to afford the N - [3 - (1 - phenyl - 5 - methyl - 4 - pyrazolyl) - 3 - oxo - 1 - propyl] - N' - [3,5 - bis-(trifluoromethyl)-phenyl]-piperazine of the formula

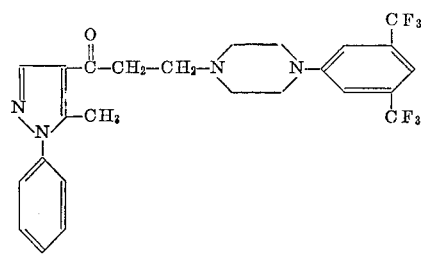

which melts at 228–230° C. (dec.).

EXAMPLE 55

A solution of 18 g. of N - [3 - (1 - phenyl-5-methyl-4-pyrazolyl) - 3 - oxo - 1 - propyl] - N'-(2-chlorophenyl)-piperazine hydrochloride in 250 ml. of 50% aq. methanol is added portionwise under stirring at room temperature to a solution of 1.8 g. sodium borohydride in 150 ml. 50% aq. methanol. After the addition, the reaction mixture is stirred for 30 minutes at room temperature, then the stirring is continued at 45–50° for 6 hours and finally it is boiled under reflux for 15 minutes. On cooling, N-[3-(1-phenyl - 5 - methyl - 4 - pyrazolyl) - 3 - hydroxy-1 - propyl] - N' - (2 - chlorophenyl) - piperazine of the formula

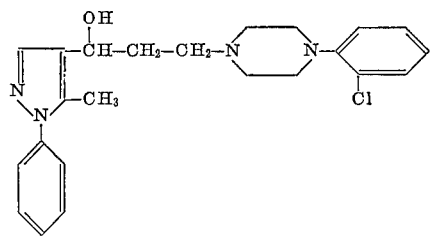

crystallizes out. After recrystallizations from ethyl acetate, it melts at 140° C.

EXAMPLE 56

5.6 g. 1 - (p - bromophenyl) - 4 - acetyl - 5 - methylpyrazole and 3.2 g. paraformaldehyde in 80 ml. of ethanol are treated with 5 g. N-(3-fluorophenyl)-piperazine hydrochloride and conc. hydrochloric acid (4 drops).

The reaction mixture is boiled under reflux overnight. On cooling, the N - [3 - (1 - p - bromophenyl - 5 - methyl - 4 - pyrazolyl) - 3 - oxo - 1 - propyl] - N' - (3 - fluorophenyl)-piperazine hydrochloride monohydrate of the formula

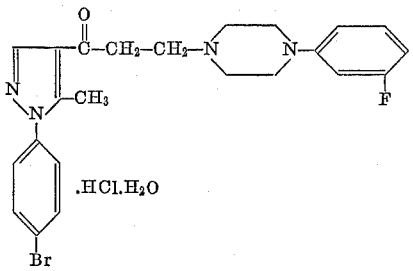

crystallizes out. After recrystallizations from methanol-ether, it melts at 210° C. (dec.).

EXAMPLE 57

4.5 g. of 1-(β-phenethyl)-4-acetyl-5-methyl pyrazole and 3.2 g. of paraformaldehyde in 100 ml. ethanol are treated with N-(2-methylphenyl)-piperazine hydrochloride and conc. hydrochloric acid (4 drops). The reaction mixture is boiled under reflux overnight. On cooling, the N-[3-(1-β-phenethyl - 5 - methyl - 4 - pyrazolyl) - 3-oxo-1-propyl] - N' - (2-methylphenyl)-piperazine hydrochloride hemihydrate of the formula

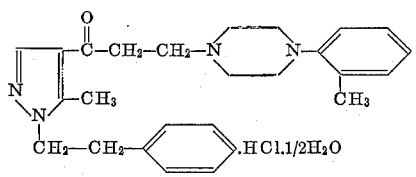

crystallizes out. After recrystallizations from methanol-ether, it melts at 185° C. (dec.).

The starting material is obtained as follows:

15.6 g. of ethoxy-methylene-acetyl acetone in 100 ml. of ether is cooled to 0° C. and a solution of 13.6 g. of phenethyl hydrazine in 50 ml. ether is added dropwise at 10° C. The reaction mixture is stirred at room temperature for 18 hours. The crystalline precipitate formed is filtered off and recrystallized from ether-petroleum ether. The thus formed 1-β-phenethyl-4-acetyl-5-methyl pyrazole melts at 55° C.

EXAMPLE 58

8.37 g. of 1-(2,5 - dichlorophenyl) - 4 - acetyl - 5-methyl pyrazole and 4.8 g. paraformaldehyde in 100 ml. of ethanol are treated with 7.53 g. of N-(4-fluorophenyl)-piperazine hydrochloride and conc. hydrochloric acid (4 drops). The reaction mixture is boiled under reflux overnight. On cooling, the N-[3-{1-(2,5-dichlorophenyl)-5-methyl-4-pyrazolyl}-3-oxo-1-propyl] - N' - (4 - fluorophenyl)-piperazine hydrochloride of the formula

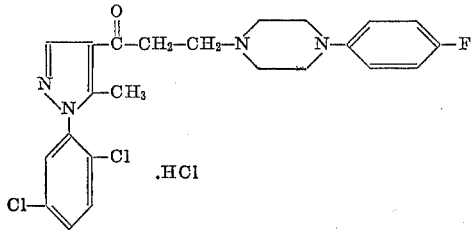

crystallizes out. After recrystallizations from methanol-ether, it melts at 226° C. (dec.).

The starting material is obtained as follows:

20 g. of ethoxy-methylene-acetyl-acetone in 100 ml. of ether is cooled to 0° and a solution of 23 g. of 2,5-dichlorophenylhydrazine in 300 ml. of ether is added dropwise at 10° C. The reaction mixture is stirred at room temperature for 18 hours. The crystalline precipitate formed is filtered off and recrystallized from n-hexane. The thus formed 1-(2,5-dichlorophenyl) - 4 - acetyl - 5-methyl-pyrazole melts at 78° C.

EXAMPLE 59

8.37 g. of 1 - (2,5-dichlorophenyl)-4-acetyl-5-methyl pyrazole and 4.8 g. of paraformaldehyde in 100 ml. of ethanol are treated with 7.31 g. of N-(2-methylphenyl)-piperazine hydrochloride and conc. hydrochloric acid (4 drops). The reaction mixture is boiled under reflux overnight. On cooling, the N-[3-{1-(2,5-dichlorophenyl) - 5-methyl - 4 - pyrazolyl} - 3 - oxo - 1 - propyl] - N' - (2-methylphenyl)-piperazine hydrochloride hemihydrate of the formula

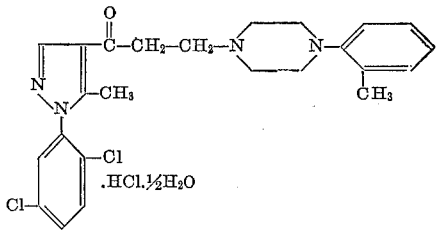

crystallizes out. After recrystallizations from methanol-ether, it melts at 202° C. (dec.).

EXAMPLE 60

2 g. of N-[3-(1-phenyl-5-methyl-4-pyrazolyl)-3-hydroxy-1-propyl]-N'-(2-methylphenyl)-piperazine is dissolved in 75 ml. tetrahydrofuran. This solution is treated with 0.5 g. acetyl-chloride and pyridine (1 drop). The reaction mixture is boiled under reflux for 4 hours and on cooling, a hygroscopic solid is obtained. This is dissolved in 20 ml. of ethanol and dry hydrogen chloride is passed into it. The solvent is removed and the residue recrystallized from methylene chloride to afford N-[3-(1-phenyl - 5-methyl-4-pyrazolyl)-3-acetoxy-1-propyl]-N'-(2-methylphenyl)-piperazine dihydrochloride monohydrate of the formula

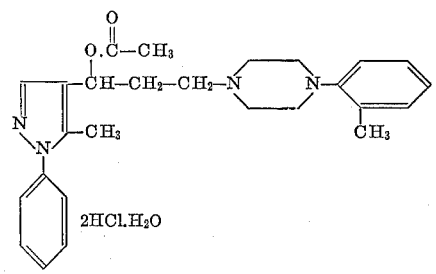

which melts at 182° C. (dec.).

EXAMPLE 61

6.84 g. of 1-(β-phenylethyl)-4-acetyl-5-methyl pyrazole and 4.8 g. paraformaldehyde in 100 ml. of ethanol are treated with N-(p-fluorophenyl)-piperazine hydrochloride and conc. hydrochloric acid (4 drops). The reaction mixture is boiled under reflux overnight. On cooling, the N-[3-(1-β-phenylethyl-5-methyl-4-pyrazolyl)-3-oxo - 1 - propyl]-N'-(4-fluorophenyl)-piperazine hydrochloride of the formula

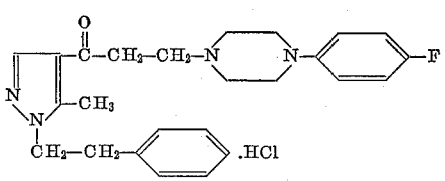

crystallizes out. After recrystallizations from methanol-ether, it melts at 175° C. (dec.).

EXAMPLE 62

4.4 g. 1-(o-fluorophenyl)-4-acetyl-5 - methyl - pyrazole and 3.2 g. paraformaldehyde in 70 ml. of ethanol are treated with 5 g. of N-(2-methylphenyl)-piperazine hydrochloride and conc. hydrochloric acid (4 drops). The reaction mixture is boiled under reflux overnight. On cooling, the N-[3-(1-o-fluorophenyl-5-methyl-4-pyrazolyl)-3-oxo-1-propyl]-N'-(2-methylphenyl)-piperazine hydrochloride of the formula

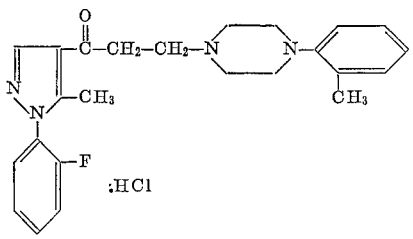

crystallizes out. After recrystallization from methanol-ether, it melts at 200° C. (dec.).

The starting material is obtained as follows:

10 g. of ethoxy-methylene-acetyl acetone in 80 ml. of ether is cooled to 0° C. and a solution of 8 g. of o-fluorophenyl-hydrazine in 120 ml. of ether is added dropwise at 10° C. The crystalline precipitate formed, is filtered off and recrystallized from ether-petroleum ether. The thus formed 1-o-fluorophenyl-4-acetyl-5-methyl pyrazole melts at 133° C.

EXAMPLE 63

3.04 g. 1-(2,4,6-trichlorophenyl)-4 - acetyl - 5 - methyl pyrazole and 1.6 g. paraformaldehyde in 30 ml. of ethanol are treated with 2.5 g. of N-(4-fluorophenyl)-piperazine hydrochloride and conc. hydrochloric acid (2 drops). The reaction mixture is boiled under reflux overnight. On cooling, the N-[3-1-(2,4,6-trichlorophenyl)-5-methyl-4-pyrazolyl-3-oxo-1-propyl]-N'-(4-fluorophenyl)-piperazine hydrochloride of the formula

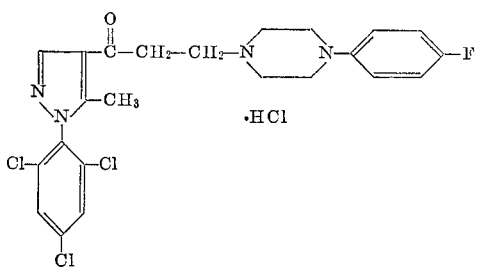

crystallizes out. After recrystallization from methanol-ether, it melts at 210° C. (dec.).

The starting material is obtained as follows:

15 g. of ethoxy-methylene-acetyl acetone in 120 ml. of chloroform, is cooled to 0° C. and a solution of 22 g. of 2,4,6-trichlorophenyl-hydrazine in 380 ml. of chloroform is added dropwise at 10° C. The crystalline precipitate formed, is filtered off and recrystallized from ethyl-acetate. The thus formed 1-(2,4,6-trichlorophenyl)-4-acetyl-5-methyl pyrazole melts at 110° C.

EXAMPLE 64

4.4 g. 1 - (p-fluorophenyl)-4-acetyl-5-methyl-pyrazole and 3.2 g. paraformaldehyde in 70 ml. of ethanol are treated with 5 g. of N-(4-fluorophenyl)-piperazine hydrochloride and conc. hydrochloric acid (4 drops). The reaction mixture is boiled under reflux overnight. On cooling, the N-[3-(1-p-fluorophenyl-5-methyl-4-pyrazolyl)-3-oxo-1-propyl]-N'-(4-fluorophenyl)-piperazine hydrochloride of the formula

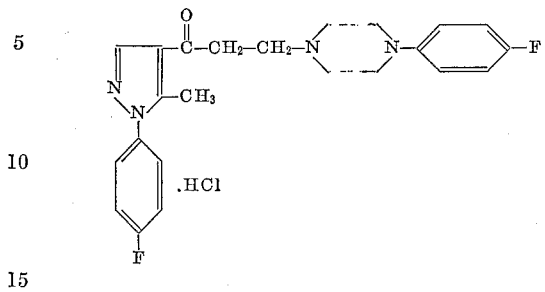

crystallizes out. After recrystallization from methanol-ether, it melts at 205° C. (dec.).

EXAMPLE 65

4.4 g. 1-(o-fluorophenyl)-4-acetyl-5-methylpyrazole and 3.2 g. paraformaldehyde in 70 ml. of ethanol are treated with 5 g. of N-(4-fluorophenyl)-piperazine hydrochloride and conc. hydrochloric acid (4 drops). The reaction mixture is boiled under reflux overnight. On cooling, the N-[3-(1-o-fluorophenyl - 5 - methyl - 4 - pyrazolyl)-3-oxo-1-propyl]-N'-(4-fluorophenyl)-piperazine hydrochloride of the formula

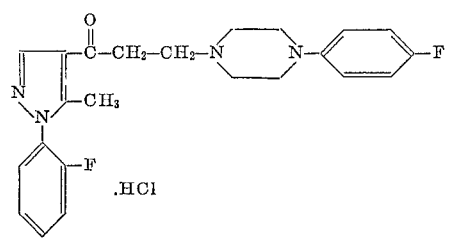

crystallizes out. After recrystallization from methanol-ether, it melts at 202° C. (dec.).

EXAMPLE 66

4.4 g. 1-(p-fluorophenyl)-4-acetyl-5-methylpyrazole and 3.2 g. paraformaldehyde in 60 ml. of ethanol are treated with 5 g. of N-(2-fluorophenyl)-piperazine hydrochloride and conc. hydrochloric acid (4 drops). The reaction mixture is boiled under reflux overnight. On cooling, the N-[3 - (1 - p - fluorophenyl-5-methyl-4-pyrazolyl)-3-oxo-1-propyl]-N'-(2-fluorophenyl)-piperazine hydrochloride of the formula

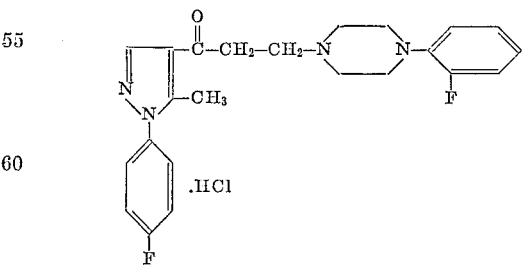

crystallizes out. After recrystallizations from methanol-ether, it melts at 210° C. (dec.).

EXAMPLE 67

5 g. of 1-(2-pyridyl)-4-acetyl-5-methylpyrazole and 4 g. of paraformaldehyde in 80 ml. of ethanol is treated with 6 g. of N-(2-methylphenyl)-piperazine hydrochloride and conc. hydrochloric acid (4 drops). The reaction mixture is boiled under reflux overnight. On cooling, the N-[3-{1 - (2 - pyridyl) - 5-methyl-4-pyrazolyl}-3-oxo-1-propyl]-

N'-(2-methylphenyl)-piperazine hydrochloride of the formula

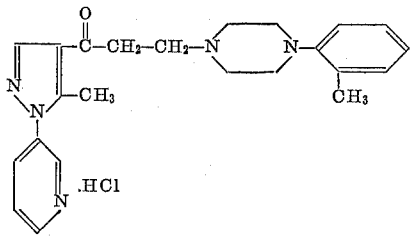

crystallizes out. After recrystallizations from methanol, it melts at 238° C. (dec.).

The starting material is obtained as follows:

21 g. of ethoxymethyleneacetylacetone in 100 ml. of ether is cooled to 0° C. and a solution of 15 g. of 2-hydrazinopyridine in 200 ml. of ether is added dropwise at 10° C. The reaction mixture is stirred at room temperature for 18 hours. The crystalline precipitate formed, is filtered off and recrystallized from ether-petroleum ether. The thus formed 1-(2-pyridyl)-4-acetyl-5-methyl pyrazole melts at 80° C.

EXAMPLE 68

5 g. of 1-(2-pyridyl)-4-acetyl-5-methyl-pyrazole and 4 g. of paraformaldehyde in 80 ml. of ethanol is treated with 6 g. of N-(2-chlorophenyl)-piperazine hydrochloride and conc. hydrochloric acid (4 drops). The reaction mixture is boiled under reflux overnight. On cooling, the N-[3 - {1 - (2 - pyridyl) - 5-methyl-4-pyrazolyl}-3-oxo-1-propyl]-N'-(2-chlorophenyl)-piperazine hydrochloride of the formula

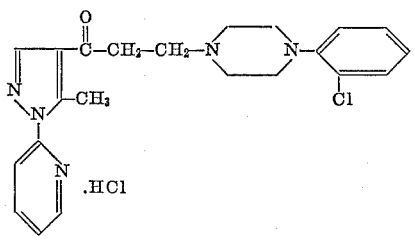

crystallizes out. After recrystallizations from methanol, it melts at 222° C. (dec.).

EXAMPLE 69

8.4 g. of 1 - (5 - bromo - 2-pyridyl)-4-acetyl-5-methyl-pyrazole and 4.8 g. of paraformaldehyde in 100 ml. of ethanol is treated with 7.53 g. of N-(4-fluorophenyl)-piperazine hydrochloride and conc. hydrochloric acid (4 drops). The reaction mixture is boiled under reflux overnight. On cooling, the N-[3-{1-(5-bromo-2-pyridyl)-5-methyl - 4 - pyrazolyl} - 3-oxo-1-propyl]-N'-(4-fluorophenyl)-piperazine hydrochloride of the formula

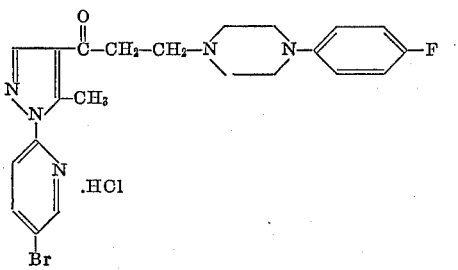

crystallizes out. After recrystallizations from methanol, it melts at 206° C. (dec.).

The starting material is obtained as follows:

18 g. of ethoxymethyleneacetylacetone in 150 ml. of chloroform is cooled to 0° C. and a solution of 5-bromo-2-hydrazinopyridine in 300 ml. of chloroform is added dropwise at 10° C. The reaction mixture is stirred at room temperature for 18 hours. The crystalline precipitate formed is filtered off and recrystallized from ethanol. The thus formed 1-(5-bromo-2-pyridyl)-4-acetyl - 5 - methyl pyrazole melts at 135° C.

EXAMPLE 70

6 g. of 1-(2pyridyl)-4-acetyl-5-methylpyrazole and 4.8 g. of paraformaldehyde to 80 ml. of ethanol is treated with 7.5 g. of N-(4-fluorophenyl)-piperazine hydrochloride and conc. hydrochloric acid (4 drops). The reaction mixture is boiled under reflux overnight. On cooling, the N[-3-{1-(2-pyradyl)-5-methyl-4-pyrazolyl}-3 - oxo - 1-propyl]-N'-(4-fluorophenyl)-piperazine hydrochloride of the formula

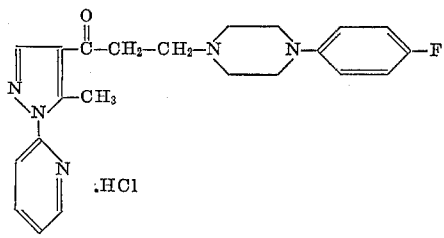

crystallizes out. After recrystallizations from methanol-ethyl acetate, it melts at 215° C. (dec.).

EXAMPLE 71

A solution of 1.8 g. of N-[3-{1-(2-pyridyl)-5-methyl-4-pyrazolyl}-3-oxo-1-propyl]-N'-(2-chlorophenyl) - piperazine hydrochloride in 200 ml. of methanol, is added portionwise under stirring at room temperature to a solution of 0.2 g. of sodium borohydride in 50 ml. of 50% aq. methanol. After the addition, the reaction is stirred for 30 minutes at room temperature, then the stirring is continued at 45-50° 2 hours and finally it is boiled for 15 minutes. The reaction mixture is concentrated to small volume, a grey mass separated which is taken up in ethyl acetate. The ethyl acetate extract is dried and acidified with dry hydrogen chloride to afford the N-[3-{1-(2-pyridyl)-5-methyl-4-pyrazolyl}-3-hydroxy-1-propyl]-N'-(2 - chlorophenyl)-piperazine hydrochloride of the formula

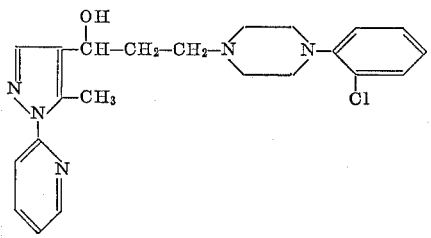

It is recrystallized from methanol-ether and melts at 210° C.

EXAMPLE 72

6 g. of 1-(2-pyridyl)-4-acetyl-5-methylpyrazole and 4.8 g. of paraformaldehyde in 100 ml. of ethanol is treated with 6.4 g. of N-(2-fluorophenyl)-piperazine hydrochloride and conc. hydrochloric acid (4 drops). The reaction mixture is boiled under reflux overnight. On cooling, the N-[3-{1-(2-pyridyl)-5-methyl-4-pyrazolyl}-3-oxo-1 - propyl]-N'-(2-fluorophenyl)-piperazine hydrochloride of the formula

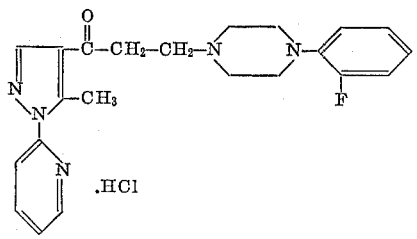

crystallizes out. After recrystallization from methanol-ether, it melts at 220° C. (dec.).

EXAMPLE 73

4 g. of 1-(2-pyridyl)-4-acetyl-5-methylpyrazole and 3.2 g. of paraformaldehyde in 70 ml. of ethanol is treated with 5 g. of N-(4-methylphenyl)-piperazine hydrochloride and conc. hydrochloric acid (4 drops). The reaction mixture is boiled under reflux overnight. On cooling, the N-[3-{1-(2-pyridyl)-5-methyl-4-pyrazolyl}-3-oxo-1-propyl]-N'-(4-methylphenyl)-piperazine hydrochloride of the formula

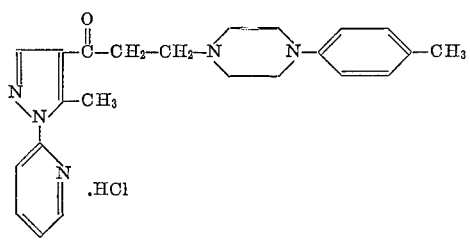

crystallizes out. After recrystallizations from methanol-ethyl acetate, it melts at 206° (dec.).

EXAMPLE 74

5.6 g. of 1-(5-bromo-2-pyridyl)-4-acetyl-5-methylpyrazole and 3.2 g. of paraformaldehyde in 60 ml. of ethanol is treated with 4.3 g. of N-(2-fluorophenyl)-piperazine hydrochloride and conc. hydrochloric acid (4 drops). The reaction mixture is boiled under reflux overnight. On cooling, the N-[3-{1-(5-bromo-2-pyridyl)-5-methyl-4-pyrazolyl}-3-oxo-1-propyl]-N'-(2-fluorophenyl)-piperazine hydrochloride of the formula

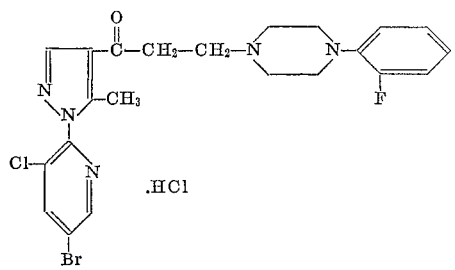

crystallizes out. After recrystallizations from methanol-ether, it melts at 230° C. (dec.).

EXAMPLE 75

4 g. of 1-(2-pyridyl)-4-acetyl-5-methylpyrazole and 3.2 g. of paraformaldehyde in 70 ml. of ethanol, is treated with 4.7 g. of N-(3-chlorophenyl)-piperazine hydrochloride and conc. hydrochloric acid (4 drops). The reaction mixture is boiled under reflux overnight. On cooling, N-[3-{1-(2-pyridyl)-5-methyl-4-pyrazolyl}-3-oxo-1-propyl]-N'-(3-chlorophenyl)-piperazine hydrochloride of the formula

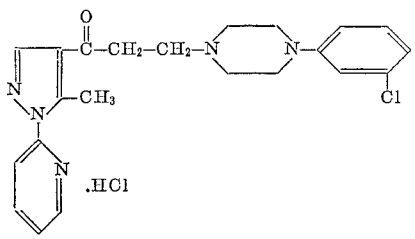

crystallizes out. After recrystallizations from methanol, it melts at 208° C. (dec.).

EXAMPLE 76

5.6 g. of 1-(5-bromo-2-pyridyl)-4-acetyl-5-methyl-pyrazole and 3.2 g. of paraformaldehyde in 70 ml. of ethanol is treated with 5.3 g. of N-(2-methoxyphenyl)-piperazine hydrochloride and conc. hydrochloric acid (4 drops). The reaction mixture is boiled under reflux overnight. On cooling, the N-[3 - {1 - (5 - bromo - 2 - pyridyl) - 5-methyl - 4 - pyrazolyl} - 3 - oxo - 1 - propyl] - N' - (2-methoxyphenyl)-piperazine hydrochloride of the formula

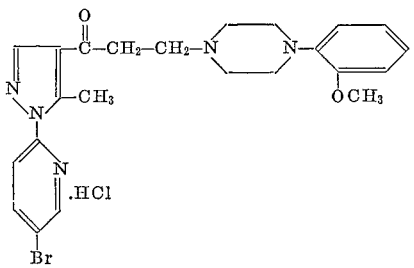

crystallizes out. After recrystallizations from methanol it melts at 220° C. (dec.).

EXAMPLE 77

A solution of 2.5 g. of N-[3-{1-(2-pyridyl)-5-methyl-4 - pyrazolyl} - 3 - oxo - 1 - propyl] - N' - (2 - methylphenyl)-piperazine hydrochloride in 150 ml. of methanol, is added portionwise under stirring at room temperature to a solution of 0.25 g. of sodium borohydride in 50 ml. of 50% aq. methanol. After the addition, the reaction is stirred for 30 minutes at room temperature, then the stirring is continued at 45–50° for 3 hours and finally it is boiled for 15 minutes. The reaction mixture is concentrated to small volume, when a gummy mass separates which is taken up in ethyl acetate. The ethyl acetate extract is dried and acidified with dry hydrogen chloride to afford the N - [3 - {1 - (2 - pyridyl) - 5 - methyl - 4-pyrazolyl} - 3 - hydroxy - 1 - propyl] - N' - (2 - methylphenyl)-piperazine hydrochloride of the formula

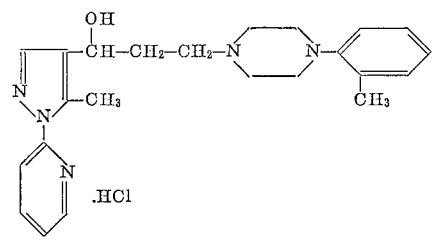

It is recrystallized from methanol-ether and melts at 208° C.

EXAMPLE 78

4 g. of 1-(4-pyridyl)-4-acetyl-5-methylpyrazole and 3.2 g. of paraformaldehyde in 70 ml. of ethanol is treated with 4.4 g. of N-(2-methylphenyl)-piperazine hydrochloride and conc. hydrochloric acid (4 drops). The reaction mixture is boiled under reflux overnight. On cooling, a hygroscopic solid material separates. This is filtered off and the residue is taken up in water, basified with 10% aq. sodium carbonate solution and the liberated base extracted with ether. The ethereal extract is dried over anhydrous sodium sulphate and evaporated to dryness. The residue is dissolved in 60 ml. of isopropanol and acidified with dry hydrogen chloride gas. A crystalline precipitate is formed which is filtered and recrystallized from methanol-ether to afford the N-[3-{1-(4-pyridyl)-5-methyl-4-pyrazolyl} - 3 - oxo - 1 - propyl] - N' - (2 - methylphenyl)-piperazine dihydrochloride monohydrate of the formula

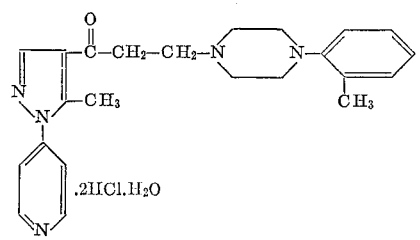

which melts at 237° C. (dec.).

The starting material is obtained as follows: 19 g. of ethoxymethyleneacetyl acetone in 100 ml. of chloroform is cooled to 0° C. and a solution of 12 g. of 4-hydrazinopyridine in 150 ml. of chloroform is added at 10° C. The reaction mixture is stirred at room temperature for 18 hours. The crystalline precipitate formed, is filtered off and recrystallized from hexane. The thus formed 1-(4-pyridyl)-4-acetyl-5-methyl-pyrazole melts at 70° C.

EXAMPLE 79

A solution of 5 g. of N-[3-{1-(4-fluorophenyl)-5-methyl - 4 - pyrazolyl} - 3 - oxo - 1 - propyl] - N' - (2 - methylphenyl)-piperazine hydrochloride in 50 ml. methanol is dropwise added to a solution of 0.5 g. sodium borohydride in 50 ml. 50% aq. methanol, at room temperature. After the addition, the reaction mixture is stirred for 30 min. at room temperature, then stirring is continued at 45–60° for 2 hours and finally it is boiled under reflux for 15 minutes. On cooling, a solid material separates. This is filtered, dissolved in ethyl acetate and acidified with dry hydrogen chloride gas. The crystalline precipitate is filtered off and recrystallized from methanol-ether to afford the N - [3 - {1 - (4 - fluorophenyl) - 5 - methyl - 4 - pyrazolyl} - 3 - hydroxy - 1 - propyl] - N' - (2 - methylphenyl)-piperazine hydrochloride of the formula

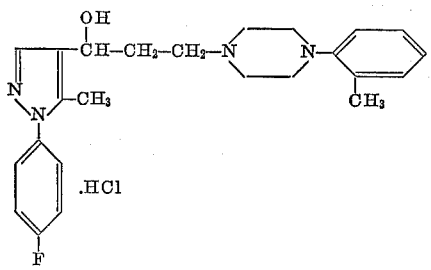

which melts at 208° C.

EXAMPLE 80

2.2 g. of 1-(2-fluorophenyl)-4-acetyl-5-methyl-pyrazole and 1.6 g. paraformaldehyde in 30 ml. of ethanol are treated with 2.15 g. of N-(2-fluorophenyl)-piperazine hydrochloride and conc. hydrochloric acid (4 drops). The reaction mixture is boiled under reflux overnight. On cooling, the N-[3-{1-(2-fluorophenyl)-5-methyl-4-pyrazolyl}-3-oxo-1-propyl]-N' - (2 - fluorophenyl)-piperazine hydrochloride of the formula

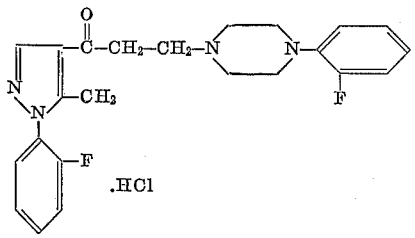

which melts at 203° C. (dec.).

EXAMPLE 81

4 g. of 1-phenyl-4-acetyl-5-methyl-pyrazole and 2.7 g. of paraformaldehyde in 50 ml. of ethanol are treated with 36 g. of bis-(β-chloroethyl)-amine hydrochloride and conc. hydrochloride acid (3 drops). The reaction mixture is boiled under reflux overnight. On cooling and dilution with 100 ml. of dry ether, a hygroscopic solid (6 g.) is obtained. This is filtered off quickly and dissolved in 60 ml. of 50% aq. methanol.

This solution is added dropwise to a solution of 0.6 g. of sodium borohydride in 60 ml. of 50% aq. methanol. After the addition, the reaction mixture is stirred for 30 min. at room temperature, then stirring is continued at 45–50° for 2 hours and finally it is boiled under reflux for 15 minutes. The reaction mixture is concentrated to a small volume, diluted with water, the suspension is extracted with ether and the ethereal solution evaporated to afford a thick oil (5.2 g.).

The thick oil (5.1 g.), 2.2 g. of p-fluoroaniline, 1.6 g. of potassium iodide and 10 ml. of water are heated to 100° C. for 1 hour. A solution of 3.15 g. of sodium carbonate dissolved in 30 ml. of water is dropwise added during 4 hours. The reaction mixture is boiled under reflux for 1 hour followed by dropwise addition of 5 ml. of conc. hydrochloric acid under stirring, 50 ml. of chloroform is added and the reaction mixture is basified with 50% sodium hydroxide solution at 60° C. It is stirred further for 1 hour and the chloroform layer separated. The aqueous layer is extracted with chloroform. The combined chloroform extract is dried over anhydrous sodium sulphate and evaporated to dryness. The residue is dissolved in benzene and filtered through a column containing 60 g. of alumina. The filtrate is evaporated to dryness. The residue is recrystallized from aq. methanol to afford the N-[3-(1-phenyl-5-methyl - 4 - pyrazolyl)-3-hydroxy-1-propyl]-N'-(4-fluorophenyl)-piperazine of the formula

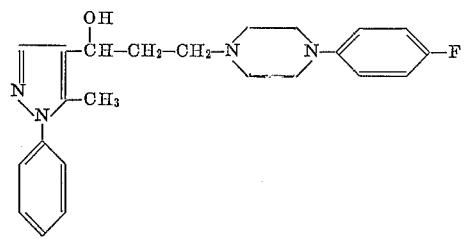

which melts at 138° C. This compound is identical with that described under Example 26.

EXAMPLE 82

3.04 g. of 1-(2,4,6-trichlorophenyl)-4-acetyl-5-methyl pyrazole and 1.6 g. paraformaldehyde in 35 ml. of ethanol are treated with 2.5 g. of N-(2-methylphenyl)-piperazine hydrochloride and conc. hydrochloric acid (2 drops). The reaction mixture is boiled under reflux overnight. On cooling, a solid separates which is basified with 10% aq. sodium carbonate solution and extracted with ethyl acetate. This extract is dried, evaporated to dryness and the residue recrystallized from isopropanol to afford the N-[3-(1-(2,4,6 - trichlorophenyl) - 5-methyl-4-pyrazolyl)-3-oxo-1-propyl]-N'-(2-methylphenyl)-piperazine of the formula

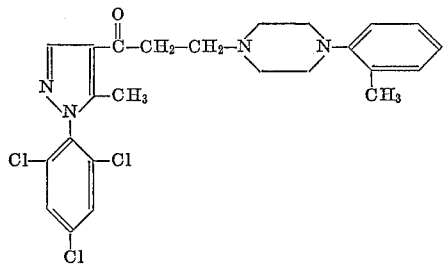

After recrystallizations from ethyl acetate-ether, it melts at 212° C. (dec.).

EXAMPLE 83

4.4 g. of 1-(m-fluorophenyl)-4-acetyl-5-methyl-pyrazole and 3.2 g. paraformaldehyde in 80 ml. of ethanol are treated with 5.05 g. of N-(4-fluorophenyl)-piperazine dihydrochloride and conc. hydrochloric acid (4 drops). The reaction mixture is boiled under reflux overnight. On cooling, the N-[3-(1-m-fluorophenyl-5-methyl-4-pyrazolyl)-3- oxo-1-propyl]-N'-(4-fluorophenyl)-piperazine hydrochloride of the formula

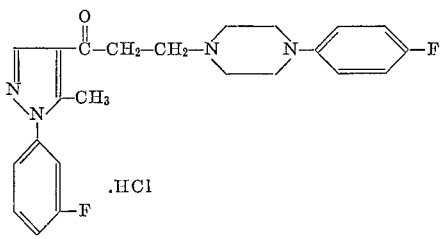

crystallizes out. After recrystallization from methanol-ether, it melts at 217° C. (dec.).

The starting material is obtained as follows:

20 g. of ethoxymethylene-acetyl acetone in 160 ml. of ether is cooled to 0° C. and a solution of 16 g. of m-fluorophenylhydrazine in 140 ml. of ether is added dropwise at 10° C. The crystalline precipitate formed on addition of petroleum ether, is filtered off and recrystallized from ether-petroleum ether. The thus obtained 1-m-fluorophenyl-4-acetyl-5-methyl pyrazole melts at 68° C.

EXAMPLE 84

4.4 g. of 1-(m-fluorophenyl)-4-acetyl-5-methyl-pyrazole and 3.2 g. paraformaldehyde in 70 ml. of ethanol are treated with 4.95 g. of N-(2-methylphenyl)-piperazine hydrochloride and conc. hydrochloric acid (4 drops). The reaction mixture is boiled under reflux overnight. On cooling, the N-[3-(1-m-fluorophenyl-5-methyl-4-pyrazolyl)-3-oxo-1-propyl]-N'-(2-methylphenyl)-piperazine hydrochloride of the formula

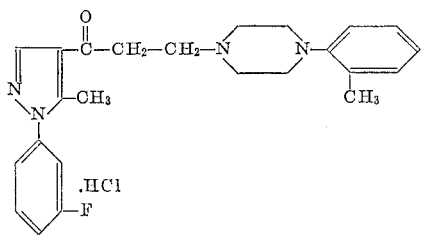

crystallizes out. After recrystallizations from methanol-ether, it melts at 235° C. (dec.).

EXAMPLE 85

3.3 g. of 1-(m-fluorophenyl)-4-acetyl-5-methyl-pyrazole and 2.4 g. paraformaldehyde in 50 ml. of ethanol are treated with 3.5 g. of N-(2-chlorophenyl)-piperazine hydrochloride and conc. hydrochloric acid (4 drops). The reaction mixture is boiled under reflux overnight. On cooling, the N-[3-(1-m-fluorophenyl-5-methyl-4-pyrazolyl)-3-oxo-1-propyl]-N'-(2 - chlorophenyl)-piperazine hydrochloride of the formula

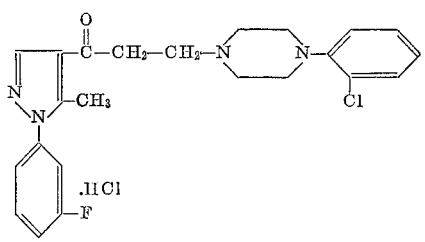

crystallizes out. After recrystallizations from methanol-ethyl acetate-ether, it melts at 208° C. (dec.).

EXAMPLE 86

A solution of 2 g. of N-[3-(1-β-phenethyl-5-methyl-4-pyrazolyl) - 3 - oxo - 1 - propyl]-N'-(4-fluorophenyl)-piperazine hydrochloride in 150 ml of methanol is dropwise added to a solution of 0.2 g. sodium borohydride in 50 ml. of 50% aq. methanol at room temperature. After the addition, the reaction mixture is stirred for 30 min. at room temperature, then stirring is continued at 45–50° C. for 2 hours and finally it is boiled under reflux for 15 minutes. The solvent is removed on the steam bath under reduced pressure and the residue is diluted with water. The aq. suspension is extracted with ethyl acetate. The organic extract is dried and evaporated to dryness. The residue is dissolved in isopropanol and dry hydrogen chloride is formed to give a crystalline precipitate which is filtered and recrystallized from isopropanol-ethyl acetate-ether to afford N-[3-(1-β-phenethyl - 5 - methyl-4-pyrazolyl)-3-hydroxy-1-propyl]-N'-(4-fluorophenyl)-piperazine hydrochloride of the formula

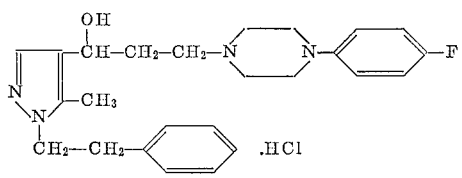

which melts at 170° C.

EXAMPLE 87

A solution of 2 g. of N-[3-(1-β-phenethyl-5-methyl-4-pyrazolyl) - 3 - oxo-1-propyl]-N'-(2 - methylphenyl)-piperazine hydrochloride hemihydrate in 150 ml. of 50% aq. methanol is dropwise added to a solution of 0.2 g. sodium borohydride in 50 ml. of 50% aq. methanol at room temperature. After the addition, the reaction mixture is stirred for 30 min. at room temperature, then stirring is continued at 45–50° C. for 2 hours and finally it is boiled under reflux for 20 minutes. The solvent is removed on steam bath under reduced pressure and the residue is diluted with water. The aq. suspension is extracted with ethyl acetate. The organic extract is dried and evaporated to dryness. The residue is dissolved in isopropanol and dry hydrogen chloride is passed to give a crystalline precipitate which is filtered and recrystallized from methanol-ether to afford N-[3-(1-β-phenethyl-5-methyl-4-pyrazolyl)-3-hydroxy-1-propyl]-N'-(2 - methylphenyl)-piperazine hydrochloride of the formula

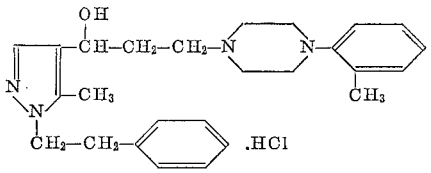

which melts at 170° C.

EXAMPLE 88

A solution of 2.5 g. of N-[3-(1-p-bromophenyl-5-methyl-4-pyrazolyl)-3-hydroxyl-1-propyl]-N' - (4 - fluorophenyl)piperazine in 75 ml. of acetonitrile is treated with 15 ml. of acetic anhydride and boiled under reflux for 2 hours. The solvent and the excess acylating agent is distilled off and the dry residue is triturated with 20 ml. water and extracted with ethyl acetate. The ethyl acetate extract is dried over anhydrous sodium sulphate and evaporated to dryness. The residue is dissolved in 20 ml. of isopropanol and dry hydrogen chloride gas is passed into this solution. A crystalline precipitate is formed which is filtered off and recrystallized from isopropanol-ethyl acetate-ether to afford N-[3-(1-p-bromophenyl-5-methyl- 4-pyrazolyl)-3-acetoxy - 1 - propyl]-N'-(4-fluorophenyl)-piperazine hydrochloride of the formula

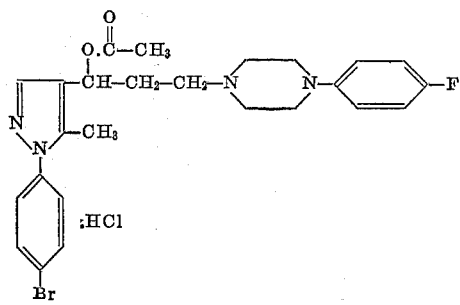

which melts at 165° C.

EXAMPLE 89

4.7 g. of 1-(m-chlorophenyl)-4-acetyl-5-methyl-pyrazole and 3.2 g. paraformaldehyde in 70 ml. of ethanol are treated with 5.05 g. of N-(4-fluorophenyl)-piperazine dihydrochloride and conc. hydrochloric acid (4 drops). The reaction mixture is boiled under reflux overnight. On cooling, the N-[3-(1-m-chlorophenyl-5-methyl-4-pyrazolyl) - 3-oxo-1-propyl]-N'-(4-fluorophenyl)-piperazine hydrochloride of the formula

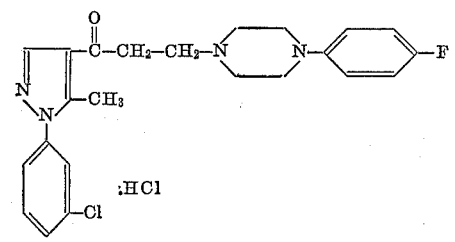

crystallizes out. After recrystallization from methanol-ether, it melts at 215° C. (dec.).

The starting material is obtained as follows:
To a solution of 22 g. of ethoxymethylene-acetyl acetone in 100 ml. of chloroform, 20 g. of m-chlorophenyl hydrazine in 150 ml. of chloroform is added dropwise at 10° C. The reaction mixture is stirred at room temperature for 18 hours, concentrated to a small volume and petroleum-ether is added to yield a crystalline substance which is recrystallized from petroleum-ether. The thus obtained 1-m-chlorophenyl-4-acetyl-5-methyl pyrazole melts at 45° C.

EXAMPLE 90

4.7 g. of 1-(m-chlorophenyl)-4-acetyl-5-methyl-pyrazole and 3.2 g. paraformaldehyde in 70 ml. of ethanol are treated with 5 g. of N-(2-methylphenyl)-piperazine dihydrochloride and conc. hydrochloric acid (4 drops). The reaction mixture is boiled under reflux overnight. On cooling, the N-[3-(1-m-chlorophenyl-5-methyl-4-pyrazolyl)-3-oxo-1-propyl]-N'-(2-methylphenyl)-piperazine hydrochloride of the formula

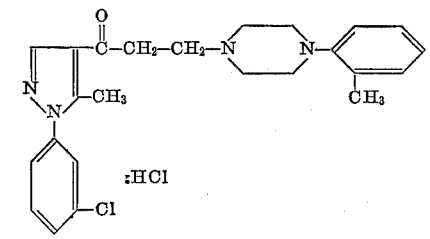

crystallizes out. After recrystallizations from methanol-ethyl acetate it melts at 222° C. (dec.).

EXAMPLE 91

4.7 g. of 1-(m-chlorophenyl)-4-acetyl-5-methyl-pyrazole and 3.2 g. paraformaldehyde in 70 ml. of ethanol are treated with 4.66 g. N-(2-chlorophenyl)-piperazine dihydrochloride and conc. hydrochloric acid (4 drops). The reaction mixture is boiled under reflux overnight. On cooling, the N-[3-(1-m-chlorophenyl-5-methyl-4-pyrazolyl)-3-oxo-1-propyl]-N'-(2-chlorophenyl)-piperazine hydrochloride of the formula

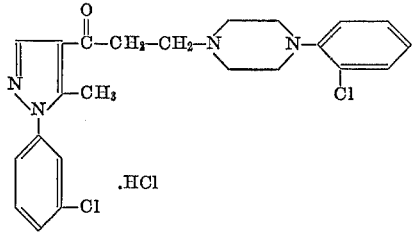

crystallizes out. After recrystallization from methanol-ethyl acetate-ether, it melts at 210° C. (dec.).

EXAMPLE 92

7.05 g. of 1-(m-chlorophenyl)-4-acetyl-5-methyl-pyrazole and 4.8 g. paraformaldehyde in 100 ml. of ethanol are treated with 7.9 g. of N-(2-methoxyphenyl)-piperazine dihydrochloride and conc. hydrochloric acid (4 drops). The reaction mixture is boiled under reflux overnight. On cooling, the N-[3-(1-m-chlorophenyl-5-methyl-4 - pyrazolyl) - 3-oxo-1-propyl]-N'-(2-methoxyphenyl)-piperazine hydrochloride of the formula

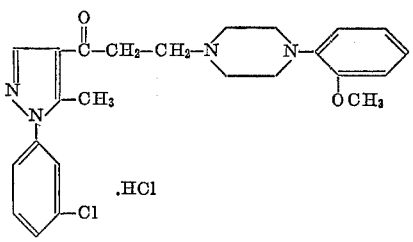

crystallizes out. After recrystallization from methanol-ethyl acetate, it melts at 202° C. (dec.).

EXAMPLE 93

43.3 g. of 1-phenyl-3,5-dimethyl-4-acetyl pyrazole and 3.2 g. paraformaldehyde in 75 ml. of ethanol are treated with 5 g. of N-(2-methylphenyl)-piperazine dihydrochloride and conc. hydrochloric acid (4 drops). The reaction mixture is boiled under reflux overnight. On cooling, the N - [3 - (1 - phenyl - 3,5-dimethyl-4-pyrazolyl)-3-oxo-1-propyl]-N'-(2-methylphenyl)-piperazine monohydrochloride dihydrate of the formula

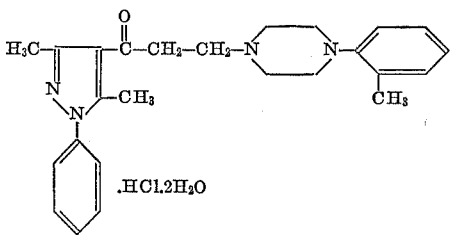

crystallizes out. After recrystallizations from methanol-ethyl acetate-ether it melts at 217° C. (dec.).

EXAMPLE 94

0.025 g. of N-[3-(1-phenyl-5-methyl-4-pyrazolyl)-3-oxo-1-propyl]-N'-(4-nitro-phenyl)-piperazine hydrochloride dissolved in 10 ml. of methanol is hydrogenated over 0.01 g. of a 10% palladium-on-carbon catalyst at room temperature and pressure. After the theoretical uptake of hydrogen, the hydrogenated solution is filtered, evaporated to dryness and the residue is recrystallised from a mixture of methanol and ethyl acetate. There is thus obtained N-[3-(1-phenyl-5-methyl-4-pyrazolyl)-3-oxo-1-propyl]-N'-(4-amino phenyl)-piperazine hydrochloride of the formula

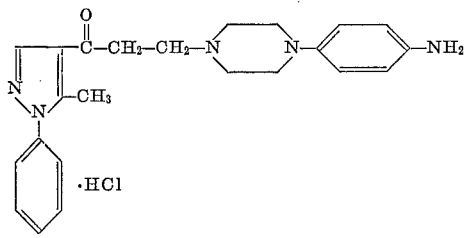

which melts at 264–265° C. (dec.) after recrystallisation from a mixture of isopropanol, ethyl acetate and ether.

EXAMPLE 95

15 g. of 4-acetyl-1-benzyl-5-methyl-pyrazole and 6.3 g. of paraformaldehyde in 180 ml. of ethanol are treated with 16.5 g. of N-(2-chlorophenyl)-piperazine dihydrochloride and 0.8 ml. conc. hydrochloric acid, the reaction mixture is boiled under reflux overnight. It is concentrated to one-third of its volume, cooled to 0° C. and 60 ml. ether are added. A crystalline precipitate is formed which is recrystallised from a mixture of isopropanol and ether to afford the N-[3-(1-benzyl-5-methyl-4-pyrazolyl)-3-oxo-1-propyl]-N'-(2-chlorophenyl)-piperazine dihydrochloride trihydrate of the formula

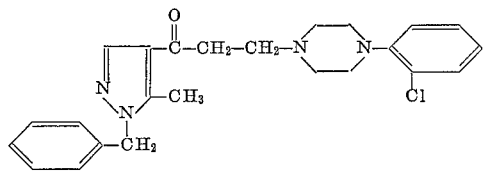

The starting material is prepared as follows:

16.3 g. of ethoxymethylene-acetyl acetone in 200 ml. of ether is cooled to 0° C. and a solution of 12.8 g. of benzylhydrazine in 400 ml. of ether is added dropwise at 10° C. The reaction mixture is stirred at room temperature for 18 hours. The reaction mixture is evaporated to dryness and the residue is recrystallised from a mixture of ether and hexane at 10° C. to afford 1-benzyl-4-acetyl-5-methyl-pyrazole which melts at 82–84° C.

EXAMPLE 96

A solution of 2.5 g. of N-[3-(1-benzyl-5-methyl-4-pyrazolyl)-3-oxo-1-propyl]-N'-(2-chlorophenyl) - piperazine dihydrochloride trihydrate in 150 ml. methanol is hydrogenated over a 10% palladium carbon catalyst at room temperature and under about 3 at. pressure. After the theoretical uptake of hydrogen, the reaction mixture is filtered, evaporated to dryness and the residue is recrystallized from methanol and ether. There is thus obtained N-[3-(5-methyl-4-pyrazolyl)-3-hydroxy-1-propyl]-N' - (2-chlorophenyl)-piperazine hydrochloride of the formula

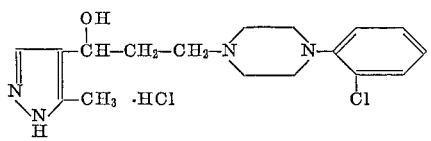

which melts at 269–270° C. (dec.) after recrystallisation from a mixture of isopropanol and methanol.

EXAMPLE 97

2 g. of 1-phenyl-4-acetyl-5-methyl-pyrazole and 0.9 g. of paraformaldehyde in 30 ml. of isopropanol are treated with 2.8 g. of 1-(4-fluoro phenyl)-2-methyl-1,4-diazacycloheptane monohydrochloride and 3 drops of conc. hydrochloric acid. The reaction mixture is boiled under reflux overnight and is then evaporated to dryness; the residue is taken up in water and the aqueous solution is washed with ether and basified with a 10% aqueous sodium carbonate solution. The liberated base is extracted with ether and the ether extract is washed with water, dried and evaporated to dryness. The residue is dissolved in ether and treated with a 1 N solution of methane sulphonic acid; a hygroscopic precipitate is formed, which is quickly filtered off and recrystallised from a mixture of isopropanol, ethyl acetate and ether to afford the 4-[3-(1-phenyl-5-methyl-4-pyrazolyl)-3-oxo-1-propyl]-1-(4-fluorophenyl)-2-methyl-1,4 - diazacycloheptane dimethane sulphonate dihydrate of the formula

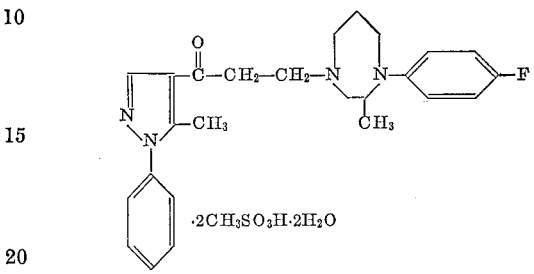

which melts at 152–155° C. (dec.). This compound is very hygroscopic.

The starting material is obtained as follows:

To a solution of 83 g. of sodium hydrogen sulfite in 154 ml. of water is added 24.65 of acetaldehyde over a period of 25 minutes, maintaining the temperature between 60 and 70° C. After an additional half-hour of stirring at this temperature, 92.13 g. of 4-fluoro-aniline is added over a 20 minute period. After 20 minutes stirring at 60–70° C., a solution of 52 g. of potassium cyanide in 90 ml. of water is added, again over a period of 20 minutes. A yellow oil, which separates, crystallises on cooling to −10° C. After filtering and recrystallising from 50% aqueous ethanol, one obtains the α-(4-fluoroanilino)-propionitrile, M.P. 73–74° C.

A suspension of 21.2 g. of sodium carbonate in a solution of 32.8 g. of α-(4-fluorophenyl)-propionitrile in 200 ml. of benzene is treated with a solution of 34.4 g. β-bromopropionyl chloride in 80 ml. dry benzene is added slowly to control the gas evolution, maintaining the temperature at 70° C. The mixture is refluxed for 2 hours, cooled to room temperature, filtered and the inorganic salts are washed with benzene. After evaporation of the filtrate, the residue is recrystallised from ether to yield N-(4-fluorophenyl)-N-(1-cyanoethyl)-N-(β-bromopropionyl)-amine which melts at 102–103° C.

A solution of 25.4 g. of N-(fluorophenyl)-N-(1-cyanoethyl)-N-(β-bromopropionyl)-amine in 85 ml. of dry tetrahydrofuran is added dropwise over 40 minute period to 11.93 g. of lithium aluminium hydride at 40° C. under nitrogen. The mixture is boiled under stirring for 8 hours, cooled to 0° C. and decomposed with 18 ml. of water (stirring for 25 min.) and 12 ml. 10% aqueous sodium hydroxide solution (stirring 15 min.). The inorganic products are filtered and washed with tetrahydrofuran, the filtrate is dried over anhydrous sodium sulfate and evaporated to dryness. The oily residue is distilled at 120°/5 mm. to yield the N-(4-fluorophenyl)-2-methyl-1,4-diazacycloheptane which forms a monohydrochloride, M.P. 142–146° C.

EXAMPLE 98

20 g. of 1-phenyl-4-acetyl-5-methyl-pyrazole and 9 g. of paraformaldehyde in 210 ml. of isopropanol are treated with 18 g. of bis-(2-chloroethyl)-amine hydrochloride and 1.5 ml. of concentrated hydrochloric acid. The reaction mixture is boiled under reflux overnight and then evaporated to dryness to yield a hygroscopic solid containing the 1-phenyl-4-[1-oxo-3-bis-(2-chloroethyl)-aminopropyl]-5-methyl-pyrazole hydrochloride. A mixture of 39.1 g. of this solid, 10.7 g. of redistilled o-toluidine, 7.6 g. of sodium iodide and 20 ml. of water is heated to 100° C. for 1 hour. A solution of 16.6 g. of sodium carbonate in 50 ml. of water is dropwise added during 4 hours. The reaction mixture is boiled under reflux for 1 hour, 11 ml. of conc. hydrochloric acid are added dropwise while stirring; the reaction mixture is diluted with 250 ml. of chloroform and basified with 10% sodium hydroxide solution at room temperature. After stirring for 10 minutes, the chloroform layer is separated and extracted with 2N hydrochloric acid. The acidic extract is basified with a 1 N aqueous potassium hydroxide solution and the liberated base is extracted with methylene chloride. This extract is dried over anhydrous magnesium sulphate and evaporated to dryness. The residue is dissolved in isopropanol and treated with a 2 N hydrochloric acid solution in isopropanol. A white crystalline precipitate is formed which is filtered and recrystallised from methanol to afford the N-[3-(1-phenyl-5-methyl-4-pyrazolyl)-3-oxo-1-propyl]-N'-(2-methyl - phenyl - piperazine hydrochloride of the formula

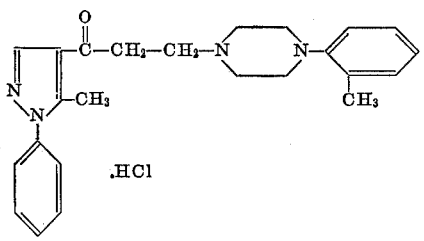

which melts at 237° C. (dec.).

EXAMPLE 99

4 g. of 1-phenyl-4-acetyl-5-methyl-pyrazole and 1.8 g. of paraformaldehyde in 60 ml. of ethanol are treated with 5.4 g. of N-(4-pyridyl)-piperazine dihydrochloride and concentrated hydrochloric acid (6 drops). The reaction mixture is boiled under reflux overnight and filtered hot; the filtrate is cooled to room temperature, and the crystalline precipitate is filtered off and recrystallised from a mixture of methanol and isopropanol to afford the N-[3-(1-phenyl-5-methyl-4-pyrazolyl)-3-oxo-1 - propyl]-N'-(4-pyridyl)-piperazine monohydrochloride monohydrate of the formula

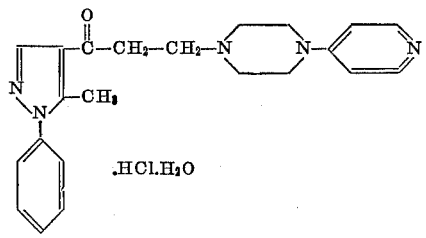

which melts at 249–251° C. (dec.).

EXAMPLE 100

Tablets containing 0.1 g. each of the active ingredient are prepared as follows:

Ingredient (for 2000 tablets): Grams
N - [3-(1-phenyl-5-methyl-4-pyrazolyl)-3-oxo-1-propyl]-N'-(2-methyl-phenyl)-piperazine hydrochloride _____ 200
Corn starch _____ 254
Talc _____ 40
Magnesium stearate _____ 6
Water, demineralized, q.s.

A mixture of 200 g. of N-[3-(1-phenyl-5-methyl-4-pyrazolyl)-3-oxo-1-propyl]-N'-(2-methyl-phenyl) - piperazine hydrochloride and 224 g. of corn starch is passed twice through a sieve No. 40. A total of 30 g. of corn starch is triturated with 20 g. of water to form a paste which is diluted with 200 g. of water and heated on the steam bath until a translucent paste is obtained. The mixture of the powders is granulated with the cooled paste, the granulate is passed through a No. 12 sieve and dried during 6 to 8 hours at 45°; the dried granules are passed through a No. 16 sieve. A mixture of the talc and the magnesium stearate is passed through a No. 60 sieve and mixed with the granulate. The product is then converted into tablets weighing 0.25 g.

In the above preparation the N-[3-(1-phenyl-5-methyl-4-pyrazolyl)-3-oxo-1-propyl]-N' - (2 - methyl - phenyl)-piperazine hydrochloride may be replaced by any other of the aforementioned compounds, particularly the N-[3-(1 - phenyl)-5-methyl-4-pyrazolyl)-3-hydroxy-1-propyl]-N'-(2-methyl-phenyl)-piperazine hydrochloride, the N-[3-(1 - p - bromophenyl-5-methyl-4-pyrazolyl)-3-oxo-1-propyl]-N'-(2-methoxy-phenyl)-piperazine hydrochloride or the N-[3-(1-p-bromophenyl-5-methyl-4-pyrazolyl)-3-oxo-1-propyl]-N'-(4-fluoro-phenyl)-piperazine hydrochloride.

I claim:

1. A member selected from the group consisting of a compound of the formula

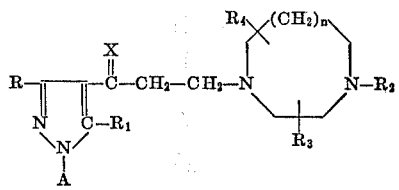

and therapeutically acceptacle acid addition salts thereof, in which A is a member selected from the group consisting of hydrogen, lower alkyl, hydroxy-lower alkyl, phenyl, phenyl-lower alkyl and pyridyl, and phenyl, phenyl-lower alkyl and pyridyl substituted in the aromatic portion by a member selected from the group consisting of lower alkyl, halogeno, lower alkoxy, trifluoromethyl, nitro and amino, R, $R_1$ and $R_3$ are selected from the group consisting of hydrogen and methyl, X is a member selected from the group consisting of an oxygen atom, and hydrogen together with a member selected from the group consisting of hydroxy, lower alkoxy and lower alkanoyloxy, $R_2$ is a member selected from the group consisting of phenyl, pyridyl and these groups substituted by a member selected from the group consisting of lower alkyl, halogeno, lower alkoxy, trifluoromethyl, nitro and amino, $R_4$ is a member selected from the group consisting of hydrogen and lower alkyl, and $n$ is 0.

2. A compound according to claim 1 and being a member selected from the group consisting of a compound of the formula

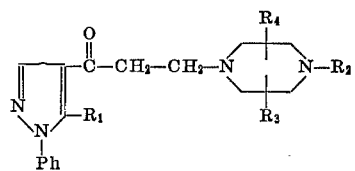

and a compound of the formula

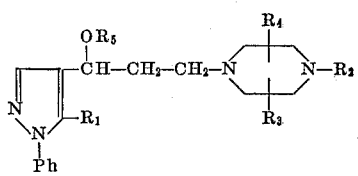

and therapeutically acceptable acid addition salts thereof wherein P$h$ is a member selected from the group consisting of halogeno-phenyl, lower alkyl-phenyl, lower alkoxy-phenyl, aminophenyl, phenyl and nitrophenyl, $R_1$ is methyl, $R_2$ is a member selected from the group consisting of phenyl, lower alkyl-phenyl, lower alkoxy-phenyl, halogeno-phenyl and trifluoromethylphenyl, and each of $R_4$ and $R_5$ is a member selected from the group consisting of hydrogen and lower alkyl, and $R_3$ is hydrogen or methyl.

3. A compound according to claim 1 and being a member selected from the group consisting of a compound of the formula

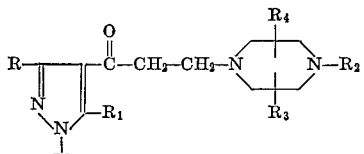

and a compound of the formula

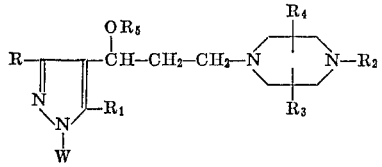

in which W is a member selected from the group consisting of the groups Q and P*h* as defined below, a compound of the formula

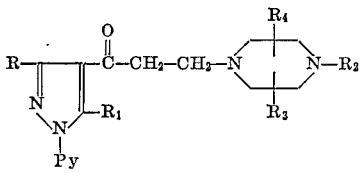

and a compound of the formula

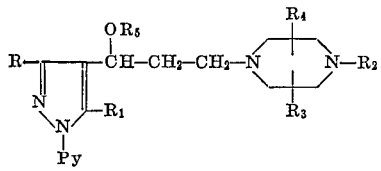

and therapeutically acceptable aci daddition salts thereof, in which R is a member selected from the group consisting of methyl and hydrogen atom, P*h* is a member selected from the group consisting of phenyl and phenyl substituted by one member selected from the group consisting of halogen, trifluoromethyl, lower alkyl, lower alkoxy, amino and nitro, Q is a member selected from the group consisting of lower hydroxyalkyl and P*h*-lower alkyl, in which P*h* has the meaning given above, Py is a member selected from the group consisting of pyridyl and pyridyl substituted as P*h*, $R_1$ is methyl, and $R_2$ is a member selected from the group consisting of phenyl and phenyl substituted by one member selected from the group consisting of lower alkyl, lower alkoxy, trifluoromethyl and halogeno, and each of $R_4$ and $R_5$ is hydrogen and lower alkyl and $R_3$ is hydrogen or methyl.

4. A compound according to claim 1 and being a member selected from the group consisting of a compound of the formula

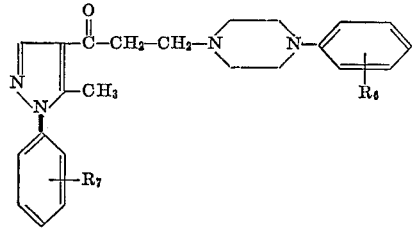

and a compound of the formula

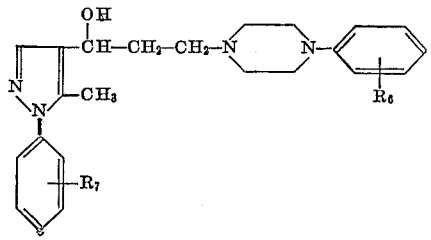

and therapeutically acceptable acid addition salts thereof, in which $R_6$ is a member selected from the group consisting of fluoro, chloro, trifluoromethyl, methyl and methoxy, and $R_7$ is a member selected from the group consisting of hydrogen and nitro.

5. A compound according to claim 1 and being a member selected from the group consisting of a compound of the formula

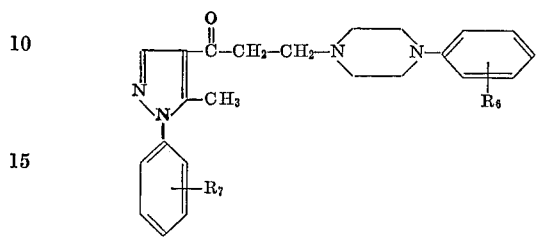

a compound of the formula

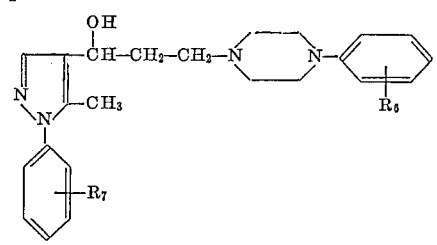

a compound of the formula

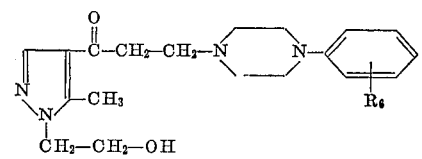

a compound of the formula

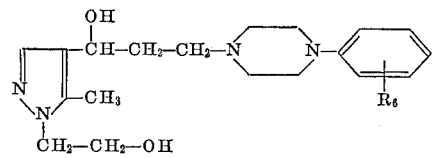

a compound of the formula

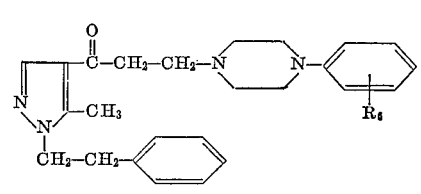

a compound of the formula

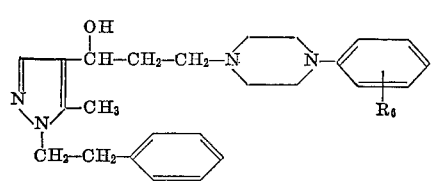

a compound of the formula

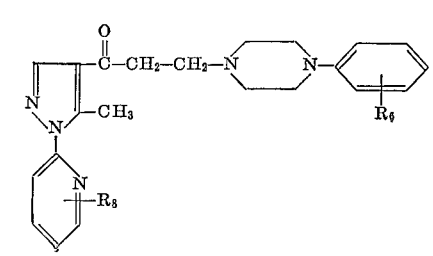

and a compound of the formula

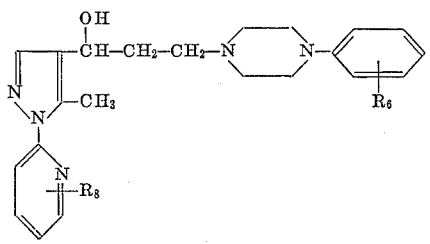

and therapeutically acceptable acid addition salts thereof, in which $R_6$ is a member selected from the group consisting of fluoro, chloro, trifluoromethyl, methyl and methoxy, $R_7$ is a member selected from the group consisting of hydrogen, fluoro and nitro, and $R_8$ is a member selected from the group consisting of hydrogen and halogeno.

6. A compound according to claim 1 and being a member selected from the group consisting of an N-[3-(1-phenyl - 5 - methyl-4-pyrazolyl)-3-hydroxy-1-propyl]-N'-(2-methylphenyl)-piperazine and a therapeutically acceptable acid addition salt thereof.

7. A compound according to claim 1 and being a member selected from the group consisting of an N-[3-(1-phenyl - 5-methyl - 4 - pyrazolyl)-3-oxo-1-propyl]-N'-(4-fluoromethyl)-piperazine and a therapeutically acceptable acid addition salt thereof.

8. A compound according to claim 1 and being a member selected from the group consisting of an N-[3-(1-phenyl - 5 - methyl-4-pyrazolyl)-3-oxo-1-propyl]-N'-(2-methyl-phenyl)-piperazine and a therapeuctically acceptable acid addition salt thereof.

9. A compound according to claim 1 and being a member selected from the group consisting of an N-[3-(1-phenyl - 5 - methyl - 4-pyrazolyl)-3-oxo-1-propyl]-N'-(2-methoxy-phenyl)-piperazine and a therapeutically acceptable acid addition salt thereof.

10. A compound according to claim 1 and being a member selected from the group consisting of an N-[3-(1-(4-nitrophenyl) - 5 - methyl - 4 - pyrazolyl)-3-hydroxy-1-propyl]-N'-(4-fluorophenyl)-piperazine and a therapeutically acceptable acid addition salt thereof.

11. A compound according to claim 1 and being a member selected from the group consisting of an N-[3-(1-β-hydroxyethyl - 5 - methyl-4-pyrazolyl)-3-oxo-1-propyl]-N'-(2-methyl-phenyl)-piperazine and a therapeutically acceptable acid addition salt thereof.

12. A compound according to claim 1 and being a member selected from the group consisting of an N-[3-(1-β-hydroxyethyl - 5 - methyl-4-pyrazolyl)-3-oxo-1-propyl]-N'-(2-methoxy-phenyl)-piperazine and a therapeutically acceptable acid addition salt thereof.

13. A compound according to claim 1 and being a member selected from the group consisting of a compound of the formula

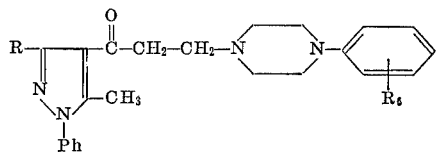

and a compound of the formula

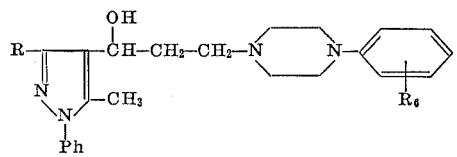

and therapeutically acceptable acid addition salts thereof, in which R is a member selected from the group consisting of lower alkyl and hydrogen, Ph is halogeno-phenyl, and $R_6$ is a member selected from the group consisting of chloro, methoxy, methyl and trifluoromethyl.

14. A compound according to claim 1 and being a member selected from the group consisting of an N-[3-(1-(4-bromophenyl) - 5 - methyl-4-pyrazolyl)-3-oxo-1-propyl]-N' - (2-methoxy-phenyl)-piperazine and a therapeutically acceptable acid addition salt thereof.

15. A compound according to claim 1 and being a member selected from the group consisting of an N-[3-(1-(4-bromophenyl) - 5 - methyl-4-pyrazolyl)-3-oxo-1-propyl]-N'-(4-fluorophenyl)-piperazine and a therapeutically acceptable acid addition salt thereof.

References Cited

UNITED STATES PATENTS 3,367,936   2/1968   Koppe _____ 260—268
3,321,475   5/1967   Kano et al. _____ 260—268
3,329,680   7/1967   Hofmann _____ 260—268

DONALD G. DAUS, Primary Examiner

U.S. Cl. X.R.

260—239, 293, 241.5, 310, 689, 690; 424—232